United States Patent [19]

Gutierrez et al.

[11] Patent Number: 5,230,834

[45] Date of Patent: Jul. 27, 1993

[54] VISCOSITY STABLE MULTIFUNCTIONAL VISCOSITY INDEX MODIFIER ADDITIVES DERIVED FROM AMIDO AMINES

[75] Inventors: Antonio Gutierrez, Mercerville; Robert D. Lundberg, Bridgewater, both of N.J.

[73] Assignee: Exxon Chemical Patents Inc., Linden, N.J.

[21] Appl. No.: 358,904

[22] Filed: May 30, 1989

[51] Int. Cl.$^5$ ................ C10M 151/00; C10M 149/06
[52] U.S. Cl. ........................ 252/47.5; 252/51.5 A; 525/301; 525/375; 525/386
[58] Field of Search ................ 525/66, 386, 375; 252/47.5, 51.5 A

[56] References Cited

U.S. PATENT DOCUMENTS

| | | | |
|---|---|---|---|
| 2,568,876 | 9/1951 | White et al. | 106/14 |
| 2,921,085 | 1/1960 | Schramm | 260/458 |
| 3,247,163 | 4/1966 | Reinking | 260/47 |
| 3,316,177 | 4/1967 | Dorer, Jr. | 252/51.5 |
| 3,326,804 | 6/1967 | Hu | 252/34 |
| 3,337,609 | 8/1967 | Williamson et al. | 260/482 |
| 3,417,140 | 12/1968 | McWhorter et al. | 260/561 |
| 3,445,441 | 5/1969 | Rushton | 260/89.5 |
| 3,448,049 | 6/1969 | Preuss et al. | 252/51.5 |
| 3,630,902 | 12/1971 | Coupland | 252/51.5 A |
| 3,903,003 | 9/1975 | Murphy et al. | 252/51.5 A |
| 4,089,794 | 5/1978 | Engel et al. | 252/51.5 A |
| 4,132,661 | 1/1979 | Waldbillig et al. | 252/51.5 A |
| 4,137,185 | 1/1979 | Gardiner et al. | 252/33 |
| 4,144,181 | 3/1979 | Elliott et al. | 252/33 |
| 4,160,739 | 7/1979 | Stambaugh et al. | 252/34 |
| 4,169,063 | 9/1979 | Kiovsky | 252/51.5 A |
| 4,171,273 | 10/1979 | Waldbillig et al. | 252/51.5 A |
| 4,219,432 | 8/1980 | Girgenti et al. | 252/51.5 A |
| 4,221,879 | 9/1980 | Humme et al. | 525/66 |
| 4,320,019 | 3/1982 | Hayashi | 252/51.5 A |
| 4,459,241 | 7/1984 | Wilson et al. | 260/502.5 E |
| 4,493,771 | 1/1985 | Wilson et al. | 210/700 |
| 4,517,104 | 5/1985 | Bloch et al. | 252/51.5 A |
| 4,628,072 | 12/1986 | Shiraki et al. | 525/66 |
| 4,632,769 | 12/1986 | Gutierrez et al. | 252/48.6 |
| 4,803,003 | 2/1989 | Chung | 252/51.5 A |
| 4,857,217 | 8/1989 | Gutierrez et al. | 252/48.2 |
| 4,956,107 | 9/1990 | Gutierrez et al. | 252/51.5 A |
| 4,966,940 | 10/1990 | Tsuji et al. | 525/66 |
| 5,053,151 | 10/1991 | Chung et al. | 252/51.5 A |

FOREIGN PATENT DOCUMENTS

| | | | |
|---|---|---|---|
| 126463 | 7/1984 | Japan | 525/66 |
| 785496 | 12/1979 | South Africa . | |
| 1578049 | 10/1980 | United Kingdom . | |
| 2055852A | 3/1981 | United Kingdom . | |

Primary Examiner—Ellen McAvoy
Attorney, Agent, or Firm—T. V. Kowalchyn

[57] ABSTRACT

The present invention is directed to a composition of matter useful as a multifunctional viscosity improver-dispersant for oleaginous compositions, particularly lubricating oil compositions, comprising at least one adduct or reaction product of (A) ethylene copolymer, preferably ethylene propylene copolymer of at least 15,000 number average molecular weight grafted with monounsaturated mono- or dicarboxylic acid material; (B) amido-amine or thioamido-amine comprising reaction product of at least one amine, preferably polyamine, and an alpha, beta-unsaturated compound represented by the formula

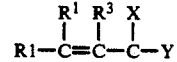

wherein X is sulfur or oxygen, Y is —OR$^4$, —SR$^4$, or

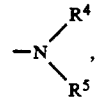

and R$^1$, R$^2$, R$^3$, R$^4$ and R$^5$ are independently selected from hydrogen, hydrocarbyl, and substituted hydrocarbyl, and (D) viscosity stabilizing effective amount of C$_{12}$ to about C$_{18}$ hydrocarbyl substituted dicarboxylic anhydride. The present invention is also directed to oleaginous compositions and concentrates, particularly lubricating oil compositions and concentrates, containing said adduct whereby said compositions exhibit improved viscosity stability for extended periods of time.

155 Claims, No Drawings

VISCOSITY STABLE MULTIFUNCTIONAL VISCOSITY INDEX MODIFIER ADDITIVES DERIVED FROM AMIDO AMINES

FIELD OF THE INVENTION

The invention relates to oil soluble polymeric compositions of matter useful as multifunctional viscosity index improver additives, particular viscosity index improver-dispersant additives, for oleaginous compositions such as fuel and lubricating oil compositions whereby oleaginous compositions containing said additives, particularly oil concentrates, are characterized by improved viscosity stability over an extended period of time, and to oleaginous compositions containing said additives.

BACKGROUND OF THE INVENTION

The concept of derivatizing V.I. improving high molecular weight ethylene copolymers, with acid moieties such as maleic anhydride, followed by reaction with an amine to form a V.I.-dispersant oil additive is known as indicated by the following patents.

U.S. Pat. No. 3,316,177 teaches ethylene-propylene-diene, which are heated to elevated temperatures in the presence of oxygen so as to oxidize the polymer and cause its reaction with maleic anhydride which is present during the oxidation. The resulting polymer can then be reacted with alkylene polyamines.

U.S. Pat. No. 4,089,794 teaches grafting the ethylene copolymer with maleic anhydride using peroxide in a lubricating oil solution, wherein the grafting is preferably carried out under nitrogen, followed by reaction with polyamine.

U.S. Pat. No. 4,137,185 teaches reacting $C_1$ to $C_{30}$ monocarboxylic acid anhydrides, and dicarboxylic anhydrides, such as acetic anhydride, succinic anhydride, etc. with an ethylene copolymer reacted with maleic anhydride and a polyalkylene polyamine to inhibit cross linking and viscosity increase due to further reaction of any primary amine groups which were initially unreacted.

U.S. Pat. No. 4,144,181 is similar to 4,137,185 in that it teaches using a sulfonic acid to inactivate the remaining primary amine groups when a maleic anhydride grafted ethylene-propylene copolymer is reacted with a polyamine.

U.S. Pat. No. 4,169,063 reacts an ethylene copolymer in the absence of oxygen and chlorine at temperatures of 150° to 250° C. with maleic anhydride followed by reaction with polyamine.

A number of prior disclosures teach avoiding the use of polyamine having two primary amine groups to thereby reduce cross-linking problems which become more of a problem as the number of amine moieties added to the polymer molecule is increased in order to increase dispersancy.

German Published Application No. P3025274.5 teaches an ethylene copolymer reacted with maleic anhydride in oil using a long chain alkyl hetero or oxygen-containing amine.

U.S. Pat. No. 4,132,661 grafts ethylene copolymer, using peroxide and/or air blowing, with maleic anhydride and then reacts with a primary-tertiary diamine.

U.S. Pat. No. 4,160,739 teaches an ethylene copolymer which is grafted, using a free-radical technique, with alternating maleic anhydride and a second polymerizable monomer such as methacrylic acid, which materials are reacted with an amine having a single primary, or a single secondary, amine group.

U.S. Pat. No. 4,171,273 reacts an ethylene copolymer with maleic anhydride in the presence of a free-radical initiator and then with mixtures of $C_4$ to $C_{12}$ n-alcohol and amine such as N-aminopropylmorpholine or dimethylamino propyl amine to form a V.I.-dispersant pour depressant additive.

U.S. Pat. No. 4,219,432 teaches maleic anhydride grafted ethylene copolymer reacted with a mixture of an amine having only one primary group together with a second amine having two or more primary groups.

German published application No. 2753569.9 shows an ethylene copolymer reacted with maleic anhydride by a free-radical technique and then reacted with an amine having a single primary group.

German published application No. 2845288 grafts maleic anhydride on an ethylene-propylene copolymer by thermal grafting at high temperatures and then reacts with amine having one primary group.

French published application No. 2423530 teaches the thermal reaction of an ethylene copolymer with maleic anhydride at 150° C. to 210° C. followed by reaction with an amine having one primary or secondary group.

The early patents such as U.S. Pat. Nos. 3,316,177 and 3,326,804 taught the general concept of grafting an ethylene-propylene copolymer with maleic anhydride and then reacting with a polyalkylene polyamine such as polyethylene amines. Subsequently, U.S. Pat. No. 4,089,794 was directed to using an oil solution for free radical peroxide grafting the ethylene copolymer with maleic anhydride and then reacting with the polyamine. This concept had the advantage that by using oil, the entire reaction could be carried out in an oil solution to form an oil concentrate, which is the commercial form in which such additives are sold. This was an advantage over using a volatile solvent for the reactions, which has to be subsequently removed and replaced by oil to form a concentrate. Subsequently, in operating at higher polyamine levels in order to further increase the dispersing effect, increased problems occurred with the unreacted amine groups cross-linking and thereby causing viscosity increase of the oil concentrate during storage and subsequent formation of haze and in some instances gelling. Even though one or more moles of the ethylene polyamine was used per mole of maleic anhydride during imide formation, cross-linking became more of a problem as the nitrogen content of the polymers was increased. One solution was to use the polyamines and then to react the remaining primary amino groups with an acid anhydride, preferably acetic anhydride, of U.S. Pat. No. 4,137,185 or the sulfonic acid or U.S. Pat. No. 4,144,181. The cross-linking problem could also be minimized by avoidance of the ethylene polyamines and instead using amines having one primary group which would react with the maleic anhydride while the other amino groups would be tertiary groups which were substantially unreactive. Patents or published applications showing the use of such primary-tertiary amines noted above are U.S. Pat. No. 4,219,432, wherein a part of the polyamine was replaced with a primary-tertiary amine; U.S. Pat. No. 4,132,661; U.S. Pat. No. 4,160,739; U.S. Pat. No. 4,171,273; German No. P2753569.9; German No. 2,845,288; and French No. 2,423,530.

Moreover, oleaginous compositions, particularly concentrates, of some of these nitrogen containing grafted olefin polymers, particularly those containing an unreacted primary amino group, tend to exhibit an increase in viscosity over a period of time. The source of the viscosity increase over an extended period of time of oil solutions of these additives appears to be, at least in part, due to the chain extension of the polymer. Several solutions to this problem are described in the prior disclosures. One solution is to use the polyamines and then to react the remaining unreacted primary amino groups with acid anhydrides of either $C_1$–$C_{30}$ monocarboxylic acids, preferably acetic anhydride, or unsubstituted or $C_1$ to $C_8$ hydrocarbyl substituted dicarboxylic acid anhydrides of U.S. Pat. No. 4,137,185; or the sulfonic acids of U.S. Pat. No. 4,144,181. Those materials act as polyamine group end-capping or inactivating agents to inhibit or limit chain extension. That is to say, the reaction product of the graft copolymer of the ethylenically unsaturated dicarboxylic acid material and polyamine is post-treated with these acid materials to inhibit chain extension and, therefore, viscosity increase of the imide grafted ethylene copolymer.

While the end-capping or amine inactivating agents disclosed in U.S. Pat. Nos. 4,137,185 and 4,144,181 are generally quite useful, their utilization results in some problems under certain conditions. Thus, for example, reacting a monocarboxylic acid anhydride, e.g., acetic anhydride, with the polyamine yields an acid by-product, e.g., acetic acid. This acid is deleterious to engine operation, causing corrosion, and generally needs to be removed from the oil solution of the V. I. improver - dispersant. Furthermore, the use of the unsubstituted or lower hydrocarbyl substituted dicarboxylic acid anhydrides of U.S. Pat. No. 4,137,185 generally does not remedy, and may sometimes even contribute to, the formation of haze in oil solutions of the imide grafted ethylene copolymer. This is due to the fact that when using free radical initiators with mineral oil as the grafting medium a proportion of the oil molecules in turn become grafted with the ethylenically unsaturated moiety, e.g., maleic anhydride, and upon subsequent reaction with the amine these grafted oil particles tend to become insoluble and to form haze. Upon the addition of the hydrocarbyl substituted dicarboxylic acid anhydrides to this oil solution to inactivate the unreacted primary amine groups of the imide grafted ethylene copolymer, a certain proportion of the anhydride reacts with the free amine groups of the grafted oil particles. Since the prior disclosure anhydrides are either unsubstituted or lower hydrocarbyl substituted they do not facilitate the solubilization of these insoluble grafted oil particles. However, since the dicarboxylic acid anhydrides of the instant invention are substituted with a $C_{12}$ to $C_{18}$ hydrocarbyl group they tend to facilitate the solubilization of the insoluble grafted oil particles, thereby decreasing haze.

The use of the sulfonic acids of U.S. Pat. No. 4,144,181 may also result in the formation of undesirable acid by-products, e.g., hydrogen sulfide.

Furthermore, these prior disclosure end-capping or primary amine inactivating agents do not, in all instances, provide a sufficient degree of viscosity stability for some applications to oil solutions of the additives of this invention.

U.S. Pat. No. 4,803,003 discloses the use of a $C_{12}$–$C_{18}$ hydrocarbyl substituted dicarboxylic acid anhydride to end-cap or react with any remaining primary amino groups of acid grafted ethylene copolymer reacted with polyamines containing at least two primary amino groups, thereby improving the viscosity stability of oil solutions of said nitrogen containing acid material grafted ethylene copolymer. However, the polyamine reactants disclosed in this patent are not the amido amine or thioamido amine reactants of the instant invention.

U.S. Pat. No. 4,517,104 discloses polymeric viscosity index (V.I.) improver-dispersant additive for petroleum oils, particularly lubricating oils, comprising a copolymer of ethylene with one or more $C_3$ to $C_{28}$ alpha-olefins, preferably propylene, which has been grafted with acid moieties such as maleic anhydride using a free radical initiator in a solvent such as lubricating oil, and then reacted with a carboxylic acid component including hydrocarbyl substituted succinic anhydride or acid having 12–400 carbon atoms in said hydrocarbyl group or long chain monocarboxylic acid, and a polyamine having two or more primary amine groups. Or the grafted polymer may be reacted with said acid component prereacted with said polyamine to form salts, amides, imides, etc. and then reacted with said grafted olefin polymer. These reactions can permit the incorporation of varnish inhibition and dispersancy into the ethylene copolymer while inhibiting cross-linking or gelling.

U.S. Pat. No. 4,632,769 discloses oil soluble viscosity index improving ethylene copolymers, such as copolymers of ethylene and propylene, reacted or grafted with ethylenically unsaturated carboxylic acid moieties, preferably maleic anhydride moieties, and then reacted with polyamines having two or more primary amine groups and a $C_{22}$ to $C_{28}$ olefin carboxylic acid component. These reactions can permit the incorporation of varnish inhibition and dispersancy into the ethylene copolymer while inhibiting cross-linking or gelling.

U.S. Pat. No. 2,921,085 relates to the preparation of beta-aminopropionamides by reaction of an alkyl amine with an acrylate to form an alkyl aminopropionate and reaction of the latter compound with an amine. The resulting compounds are disclosed to have utility as surface active agents, specifically as emulsifying, wetting, foaming and detergent agents.

U.S. Pat. No. 3,337,609 relates to adducts of hydroxyalkyl alkylene polyamines and acrylates. The resulting adducts are added to polyepoxides to provide compositions which are suitable for use as a barrier coating for polyethylene surfaces, and for additional end uses, such as in molding. In addition, the adducts are disclosed to be useful as catalysts in resin preparation and as corrosion inhibitors in water systems for ferrous metals.

U.S. Pat. No. 3,417,140 relates to the preparation of amido-amine compositions, which are useful as epoxy resin curing agents, by reacting a polyalkylene polyamine and a fatty amine (comprising a mono- or diamine having as one of the substituents on a nitrogen atom a hydrocarbyl radical having 8 to 24 carbon atoms) with an alpha-beta unsaturated carbonylic compound. It is disclosed that this reaction occurs through the Michael addition of an amine group across the unsaturated group of the carbonylic compound and through the condensation of an amine group with the carbonylic group.

U.S. Pat. No. 3,247,163 also relates to curing agents for polyepoxide compositions, which curing agents are prepared by reacting an organic amine and an acrylate.

U.S. Pat. No. 3,445,441 relates to amino-amido polymers characterized by being a reaction product of at least a polyamine and an acrylate type compound, such as methyl or ethyl acrylate, and methyl or ethyl methacrylate. The patent states that the polymers are useful in a wide variety of applications, such as flocculating agents, water clarifying additives, corrosion inhibitors in oil and gas wells, and as lube oil additives. The patent further discloses that the polymers may be derivitized, including acylation with monocarboxylic acids and polycarboxylic acids, aliphatic dicarboxylic acids, aromatic dicarboxylic acids, for example, diglycolic, phthalic, succinic, etc., acids.

U.S. Pat. No. 3,903,003 relates to lubricating compositions containing an amido-amine reaction product of a terminally carboxylated isoprene polymer which is formed by reacting a terminally carboxylated substantially completely hydrogenated polyisoprene having an average molecular weight between about 20,000 and 250,000 and a nitrogen compound of the group consisting of polyalkylene amines and hydroxyl polyalkylene amines.

U.S. Pat. No. 4,493,771 relates to scale inhibiting with compounds containing quaternary ammonium and methylene phosphonic acid groups. These compounds are derivatives of polyamines in which the amine hydrogens have been substituted with both methylene phosphonic acid groups or their salts and hydroxypropyl quaternary ammonium halide groups. The patent discloses that any amine that contains reactive amino hydrogens can be utilized, for example, polyglycol amines, amido-amines, oxyacylated amines, and others.

U.S. Pat. No. 4,459,241 contains a similar disclosure to U.S Pat. No. 4,493,771.

The materials of the present invention are an improvement over those of the aforediscussed prior disclosures because of their effectiveness and their ability to provide enhanced lubricating oil dispersancy, and because oleaginous compositions, particularly oil concentrates, containing these materials exhibit viscosity stability over time, e.g., upon storage.

SUMMARY OF THE INVENTION

Compositions of matter useful as multifunctional viscosity index improvers for oleaginous compositions, including fuel and lubricating oil compositions, whereby oleaginous compositions thereof, particularly oil concentrates, exhibit improved viscosity stability over extended periods of time. These compositions of matter comprise high molecular weight ethylene copolymers, such as ethylene-α-olefin copolymers, reacted or grafted with ethylenically unsaturated carboxylic acid materials, such as maleic anhydride, and reacted with an amido-amine or thioamido amine, and subsequently post-treated or post-reacted with a viscosity stabilizing effective amount of at least one $C_{12}$–$C_{18}$ hydrocarbyl substituted dicarboxylic anhydride. The amido-amine is characterized by being a reaction product of at least one polyamine and an α-, β- unsaturated compound of the formula

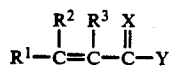
(I)

wherein X is sulfur or oxygen, Y is —$OR^4$, —$SR^4$, or —$NR^4(R^5)$, and $R^1$, $R^2$, $R^3$, $R^4$ and $R^5$ are the same or different and are hydrogen or substituted or unsubstituted hydrocarbyl.

DETAILED DESCRIPTION OF THE INVENTION

The compositions of matter of the instant invention comprise high molecular weight, e.g., at least 15,000 number average molecular weight, copolymers of ethylene, preferably copolymers of ethylene and at least one other $C_3$ to $C_{28}$ alpha-olefin such as propylene, reacted or grafted with ethylenically unsaturated carboxylic acid material to form a grafted ethylene copolymer, followed by reaction with an amido-amine or thioamido amine, and subsequently post-treated or reacted with at least one $C_{12}$–$C_{18}$ hydrocarbyl substituted dicarboxylic anhydride. These materials are useful as multifunctional viscosity index improver additives, particularly viscosity index improver-dispersant additives, for oleaginous compositions such as fuel and lubricating oil compositions whereby oleaginous compositions, particularly lubricating oil compositions and lubricating oil concentrates, exhibit reduced viscosity increase over prolonged periods of time, e.g., exhibit improved viscosity stability.

ETHYLENE COPOLYMER

Oil soluble ethylene copolymers used in the invention are those capable of modifying or improving the viscosity index of oleaginous compositions, particularly lubricating oil compositions, i.e., polymers useful as V.I. improvers. Therefor, they generally will have a number-average molecular weight ($\overline{M}_n$) of greater than about 10,000, preferably at least about 15,000. Preferably these ethylene copolymers have number average molecular weights of from about 15,000 to about 500,000; preferably about 20,000 to about 300,000, and more preferably from about 30,000 to about 150,000. These V.I. improvers will generally have a narrow range of molecular weight, as determined by the ratio of weight-average molecular weight ($\overline{M}_w$) to number-average molecular weight ($\overline{M}_n$) Polymers having a $\overline{M}_w/\overline{M}_n$ of less than 10, preferably less than 7, and more preferably 4 or less are most desirable As used herein ($\overline{M}_n$) and ($\overline{M}_w/\overline{M}_n$) are measured by the well known techniques of vapor phase osmometry (VPO), membrane osmometry and gel permeation chromatography. In general, polymers having a narrow range of molecular weight may be obtained by a choice of synthesis conditions such as choice of principal catalyst and cocatalyst combination, addition of hydrogen during the synthesis, etc. Post synthesis treatment such as extrusion at elevated temperature and under high shear through small orifices, mastication under elevated temperatures, thermal degradation, fractional precipitation from solution, etc. may also be used to obtain narrow ranges of desired molecular weights and to break down higher molecular weight polymer to different molecular weight grades for V.I. use.

These polymers are prepared from ethylene and ethylenically unsaturated hydrocarbons including cyclic, alicyclic and acyclic, containing from 3 to 28 carbons, e.g. 2 to 18 carbons. These ethylene copolymers may contain from 15 to 90 wt. % ethylene, preferably 30 to 80 wt. % of ethylene and 10 to 85 wt. %, preferably 20 to 70 wt. % of one or more $C_3$ to $C_{28}$, preferably $C_3$ to $C_{18}$ more preferably $C_3$ to $C_8$, unsaturated hydrocarbons, preferably alpha olefins. While not essential, such copolymers preferably have a degree of crystallinity of less than 25 wt. %, as determined by X-ray diffraction and differential scanning calorimetry. Copolymers of ethylene and propylene are most preferred. Other alpha-olefins suitable in place of propylene to form the copolymer, or to be used in combination with ethylene and propylene, to form a terpolymer, tetrapolymer, etc., 1-pentene, 1-hexene, 1-heptene, 1-octene, 1-nonene, 1-decene, etc.; also branched chain alpha-olefins, such as 4-methyl-1-pentene, 4-methyl-1-hexene, 5-methylpentene-1, 4,4-dimethyl-1-pentene, and 6-methylheptene-1, etc., and mixtures thereof.

The term copolymer as used herein, unless otherwise indicated, includes terpolymers, tetrapolymers, etc., of ethylene, said C3-28 alpha-olefin and/or a non-conjugated diolefin or mixtures of such diolefins which may also be used. The amount of the non-conjugated diolefin will generally range from about 0.5 to 20 mole percent, preferably about 1 to about 7 mole percent, based on the total amount of ethylene and alpha-olefin present.

Representative examples of non-conjugated dienes that may be used as the third monomer in the terpolymer include:

a. Straight chain acyclic dienes such as: 1,4-hexadiene; 1,5-heptadiene; 1,6-octadiene.
b. Branched chain acyclic dienes such as: 5-methyl-1,4-hexadiene; 3,7-dimethyl 1,6-octadiene; 3,7-dimethyl 1,7-octadiene; and the mixed isomers of dihydro-myrcene and dihydro-cymene.
c. Single ring alicyclic dienes such as: 1,4-cyclohexadiene; 1,5-cyclooctadiene; 1,5-cyclododecadiene; 4-vinylcyclohexene; 1-allyl-4-isopropylidene cyclohexane; 3-allyl-cyclopentene; 4-allyl-cyclohexene and 1-isopropenyl-4-(4-butenyl) cyclohexane.
d. Multi-single ring alicyclic dienes such as: 4,4'-dicyclopentenyl and 4,4'-dicyclohexenyl dienes.
e. Multi-ring alicyclic fused and bridged ring dienes such as: tetrahydroindene; methyl tetrahydroindene; dicyclopentadiene; bicyclo (2.2.1) hepta-2,5-diene; alkyl, alkenyl, alkylidene, cycloalkenyl and cycloalkylidene norbornenes such as: ethyl norbornene; 5-methylene-6-methyl-2-norbornene; 5-methylene-6,6-dimethyl-2-norbornene; 5-propenyl-2-norbornene; 5-(3-cyclopentenyl)2-norbornene and 5-cyclohexylidene-2-norbornene; norbornadiene; etc.

CARBOXYLIC ACID MATERIAL

The carboxylic acid material which is grafted to or reacted with the ethylene copolymer to form the grafted ethylene copolymer is preferably ethylenically unsaturated, preferably monounsaturated, carboxylic acid material and can be either a monocarboxylic or dicarboxylic acid material. The dicarboxylic acid materials include (i) monounsaturated $C_4$ to $C_{10}$ dicarboxylic acid wherein (a) the carboxyl groups are vicinyl, i.e., located on adjacent carbon atoms, and (b) at least one, preferably both, of said adjacent carbon atoms are part of said monounsaturation; and (ii) derivatives of (i) such as anhydrides or $C_1$ to $C_5$ alcohol derived mono- or diesters of (i). Upon reaction with the ethylene copolymer the monounsaturation of the dicarboxylic acid, anhydride, or ester becomes saturated. Thus, for example, maleic anhydride becomes an ethylene copolymer substituted succinic anhydride.

The monocarboxylic acid materials include (i) monounsaturated $C_3$ to $C_{10}$ monocarboxylic acid wherein the carbon-carbon bond is conjugated to the carboxy group, i.e., of the structure

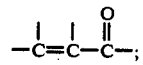

and (ii) derivatives of (i) such as $C_1$ to $C_5$ alcohol derived monoesters of (i). Upon reaction with the ethylene copolymer, the monounsaturation of the monounsaturated carboxylic acid material becomes saturated. Thus, for example, acrylic acid becomes an ethylene copolymer substituted propionic acid, and methacrylic acid becomes an ethylene copolymer substituted isobutyric acid.

Exemplary of such unsaturated mono- and dicarboxylic acids, or anhydrides and thereof include fumaric acid, itaconic acid, maleic acid, maleic anhydride, chloromaleic anhydride, acrylic acid, methacrylic acid, crotonic acid, cinnamic acid, methyl acrylate, ethyl acrylate, methyl methacrylate, etc.

Preferred carboxylic acid materials are the dicarboxylic acid anhydrides. Maleic anhydride or a derivative thereof is particularly preferred as it does not appear to homopolymerize appreciably but grafts onto the ethylene copolymer to give two carboxylic acid functionalities. Such preferred materials have the generic formula

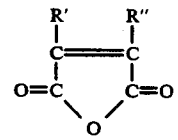

wherein R' and R" are independently hydrogen or a halogen.

Additionally, as taught by U.S. Pat. Nos. 4,160,739 and 4,161,452, both of which are incorporated herein by reference, various unsaturated comonomers may be grafted on the ethylene copolymer together with the unsaturated carboxylic acid material. Such graft monomer systems may comprise one or a mixture of comonomers different from said unsaturated carboxylic acid material, and which contain only one copolymerizable double bond and are copolymerizable with said unsaturated acid component.

Typically, such comonomers do not contain free carboxylic acid groups and are esters containing alpha-ethylenic unsaturation in the acid or alcohol portion; hydrocarbons, both aliphatic and aromatic, containing, alpha-ethylenic unsaturation, such as the $C_4$-$C_{12}$ alpha olefins, for example hexene, nonene, dodecene, etc.; styrenes, for example styrene, alpha-methyl styrene, p-methyl styrene, butyl styrene, etc.; and vinyl monomers, for example vinyl acetate, vinyl chloride, vinyl ketones such as methyl and ethyl vinyl ketone, and nitrogen containing vinyl monomer such as vinyl pyridine and vinyl pyrrolidine, etc. Comonomers containing functional groups which may cause crosslinking, gelation or other interfering reactions should be avoided, although minor amounts of such comonomers (up to about 10% by weight of the comonomer system) often can be tolerated.

Specific useful copolymerizable comonomers include the following:

(A) Esters of saturated acids and unsaturated alcohols wherein the saturated acids may be monobasic or polybasic acids containing up to about 40 carbon atoms such as the following: acetic, propionic, butyric, valeric, caproic, stearic, oxalic, malonic, succinic, glutaric, adipic, pimelic, suberic, azelaic, sebacic, phthalic, isophthalic, terephthalic, hemimellitic, trimellitic, trimesic and the like, including mixtures. The unsaturated alcohols may be monohydroxy or polyhydroxy alcohols and may contain up to about 40 carbon atoms, such as the following: allyl, methallyl, crotyl, 1-chloroallyl, 2-chloroallyl, cinnamyl, vinyl, methyl vinyl, 1-phenallyl, butenyl, propargyl, 1-cyclohexene-3-ol, oleyl, and the like, including mixtures.

(B) Esters of unsaturated monocarboxylic acids containing up to about 12 carbon atoms such as acrylic, methacrylic and crotonic acid, and an esterifying agent containing up to about 50 carbon atoms, selected from its saturated alcohols and alcohol epoxides. The saturated alcohols may preferably contain up to about 40 carbon atoms and include monohydroxy compounds such as: methanol, ethanol, propanol, butanol, 2-ethylhexanol, octanol, dodecanol, cyclohexanol, cyclopentanol, neopentyl alcohol, and benzyl alcohol; and alcohol ethers such as the monomethyl or monobutyl ethers of ethylene or propylene glycol, and the like, including mixtures. The alcohol epoxides include fatty alcohol epoxides, glycidol, and various derivatives of alkylene oxides, epichlorohydrin, and the like, including mixtures.

The components of the graft copolymerizable system are used in a ratio of unsaturated carboxylic acid material monomer component to comonomer component of about 1:4 to 4:1, preferably about 12 to 2:1 by weight.

GRAFTING OF THE ETHYLENE COPOLYMER

The grafting of the ethylene copolymer with the carboxylic acid material may be by any suitable method, such as thermally by the "ene" reaction, using copolymers containing unsaturation, such as ethylene-propylene-diene polymers either chlorinated or unchlorinated, or more preferably it is by free-radical induced grafting in solvent, preferably in a mineral lubricating oil as solvent.

The radical grafting is preferably carried out using free radical initiators such as peroxides, hydroperoxides, and azo compounds and preferably those which have a boiling point greater than about 100° C. and which decompose thermally within the grafting temperature range to provide said free radicals. Representative of these free-radical initiators are azobutyro-nitrile, 2,5-dimethyl-hex-3-yne-2, 5 bis-tertiary-butyl peroxide (sold. as Lupersol 130) or its hexane analogue, di-tertiary butyl peroxide and dicumyl peroxide. The initiator is generally used at a level of between about 0.005% and about 1%, based on the total weight of the polymer solution, and temperatures of about 150° to 220° C.

The ethylenically unsaturated carboxylic acid material, such as maleic anhydride, will be generally used in an amount ranging from about 0.01% to about 10%, preferably 0.1 to 2.0%, based on weight of the initial total solution. The aforesaid carboxylic acid material and free radical initiator are generally used in a weight percent ratio range of 1.0:1 to 30:1, preferably 3.0:1 to 6:1.

The initiator grafting is preferably carried out in an inert atmosphere, such as that obtained by nitrogen blanketing. While the grafting can be carried out in the presence of air, the yield of the desired graft polymer is generally thereby decreased as compared to grafting under an inert atmosphere substantially free of oxygen. The grafting time will usually range from about 0.1 to 12 hours, preferably from about 0.5 to 6 hours, more preferably 0.5 to 3 hours. The graft reaction will be usually carried out to at least approximately 4 times, preferably at least about 6 times the half-life of the free-radical initiator at the reaction temperature employed, e.g. with 2,5-dimethyl hex-3-yne-2, 5-bis(t-butyl peroxide) 2 hours at 160° C. and one hour at 170° C., etc.

In the grafting process, usually the copolymer solution is first heated to grafting temperature and thereafter said unsaturated carboxylic acid material and initiator are added with agitation, although they could have been added prior to heating. When the reaction is complete, the excess acid material can be eliminated by an inert gas purge, e.g. nitrogen sparging. Preferably the carboxylic acid material that is added is kept below its solubility limit in the polymer solution, e.g. below about 1 wt. %, preferably below 0.4 wt. % or less, of free maleic anhydride based on the total weight of polymer-solvent solution, e.g. ethylene copolymer mineral lubricating oil solution. Continuous or periodic addition of the carboxylic acid material along with an appropriate portion of initiator, during the course of the reaction, can be utilized to maintain the carboxylic acid below its solubility limits, while still obtaining the desired degree of total grafting.

In the initiator grafting step the maleic anhydride or other carboxylic acid material used will be grafted onto both the polymer and the solvent for the reaction. Many solvents such as dichlorobenzene are relatively inert and may be only slightly grafted, while mineral oil will tend to be more grafted. The exact split of graft between the substrate present depends upon the polymer and its reactivity, the reactivity and type of oil, the concentration of the polymer in the oil, and also upon the maintenance of the carboxylic acid material in solution during the course of the reaction and minimizing the presence of dispersed, but undissolved acid, e.g. the maleic anhydride. The undissolved acid material appears to have an increased tendency to react to form oil insoluble materials as opposed to dissolved acid material. The split between grafted oil and grafted polymer may be measured empirically from the infrared analyses of the product dialyzed into oil and polymer fractions.

The grafting is preferably carried out in a mineral lubricating oil which need not be removed after the grafting step but can be used as the solvent in the subsequent reaction of the graft polymer with the amine material and as a solvent for the end product to form the lubricating additive concentrate. The oil having attached, grafted carboxyl groups, when reacted with the amine material will also be converted to the corresponding derivatives.

The solution grafting step when carried out in the presence of a high temperature decomposable peroxide can be accomplished without substantial degradation of the chain length (molecular weight) of the ethylene containing polymer. This can be an advantage as opposed to high temperature thermal reactions which depend on degradation to apparently form free radical reactive sites. Measurement of molecular weights and degradation can be evaluated by determination of the thickening efficiency (T.E.) of the polymer as will later be described.

The amount of carboxylic acid material used in the grafting reaction is an amount which is effective to provide a grafted ethylene copolymer which upon further reaction with an amido-amine as described hereinafter provides a material exhibiting the properties of a multifunctional viscosity index improver additive, more specifically a viscosity index improver-dispersant additive, i.e., a material having both V.I. improving and dispersancy properties in an oleaginous composition. That is to say, an amount which is effective to provide, upon reaction of the grafted ethylene copolymer with the amido amine, an oleaginous composition exhibiting improved viscometric and dispersancy properties. Generally, this amount of grafting material, e.g., moles of carboxylic acid material such as maleic anhydride, is an amount which is effective to provide a grafted ethylene copolymer, e.g., ethylene-alpha-olefin substituted carboxylic acid material such as ethylene-propylene substituted succinic anhydride, containing an average number of acid material moieties, e.g., succinic anhydride, grafted to or present on a 10,000 number average molecular weight segment of a molecule of ethylene copolymer of at least about 0.1, preferably at least about 0.5, and more preferably at least about 1. The maximum average number of grafted moieties present per 10,000 average number molecular weight segment of a molecule of ethylene copolymer backbone should not exceed about 10, preferably about 7 and more preferably about 5. Preferably, the average number, moles, of grafted moieties present per mole of ethylene copolymer backbone is at least about 0.6, preferably at least about 0.8, and more preferably at least about 1. Preferably, the maximum average number of grafted moieties grafted to or present per mole of ethylene copolymer backbone should generally not exceed about 10, preferably about 7, and more preferably about 5. Thus, for example, a mole of grafted ethylene copolymer, e.g., ethylene-propylene substituted succinic anhydride, containing an ethylene copolymer backbone such as an ethylene-propylene backbone having an average number molecular weight of 50,000 contains grafted to said backbone an average number of succinic anhydride moieties of from about 0.5 to about 50, preferably from about 0.6 to about 10. Typically, from about 0.2 to about 12, preferably from about 0.4 to about 6 moles of said carboxylic acid material are charged to the reactor per mole of ethylene copolymer charged.

Normally, not all of the ethylene copolymer reacts with the carboxylic acid material, e.g., maleic anhydride, to produce a grafted ethylene copolymer, e.g., ethylene-propylene substituted succinic anhydride. The resultant reaction product mixture, therefore, contains reacted or grafted ethylene copolymer, e.g., ethylene-propylene substituted succinic anhydride, unreacted or ungrafted ethylene copolymer, and unreacted grafting material, e.g., maleic anhydride. The unreacted ethylene copolymer is typically not removed from the reaction product mixture, and the reaction product mixture, generally stripped of any unreacted grafting material, is utilized as is or is employed for further reaction with the amine as described hereinafter.

Characterization of the average number of moles of carboxylic acid material, e.g., maleic anhydride, which have reacted per mole of ethylene copolymer charged to the reaction (whether it has undergone reaction or not) is defined herein as the average number of grafted moieties grafted to or present per mole of ethylene copolymer backbone. This number is defined solely with reference to the resulting reaction product mixture. Although the amount of said unreacted ethylene copolymer contained in the resulting reaction product mixture can be subsequently modified, i.e., increased or decreased by techniques known in the art, such modifications do not alter the average number of grafted moieties as defined above. The term grafted ethylene copolymer is intended to refer to the reaction product mixture whether it has undergone such modification or not.

AMIDO-AMINE

As described above, the amido-amine comprises a reaction product of at least a polyamine and an alpha, beta ethylenically unsaturated compound of formula (I) above.

The polyamines useful in this invention comprise polyamines, most preferably polyalkylene polyamines, of about 2 to 60, preferably 2 to 40 (e.g. 3 to 20), total carbon atoms and about 1 to 12, preferably 2 to 12, more preferably 3 to 12, and most preferably at least 5 (e.g., 5 to 9) nitrogen atoms in the molecule. These amines may be hydrocarbyl amines or may be hydrocarbyl amines including other groups, e.g, hydroxy groups, alkoxy groups, amide groups, nitriles, imidazoline groups, and the like. Hydroxy amines with 1 to 6 hydroxy groups, preferably 1 to 3 hydroxy groups are particularly useful. Preferred amines are aliphatic saturated amines, including those of the general formulas:

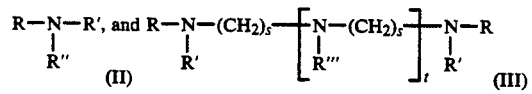

wherein R, R', R" and R''' are independently selected from the group consisting of hydrogen; $C_1$ to $C_{25}$ straight or branched chain alkyl radicals; $C_1$ to $C_{12}$ alkoxy $C_2$ to $C_6$ alkylene radicals; $C_2$ to $C_{12}$ hydroxy amino alkylene radicals; and $C_1$ to $C_{12}$ alkylamino $C_2$ to $C_6$ alkylene radicals; and wherein R''' can additionally comprise a moiety of the formula:

wherein R' is as defined above, and wherein s and s' can be the same or a different number of from 2 to 6, preferably 2 to 4; and t and t' can be the same or different and are numbers of from 0 to 10, preferably 2 to 7, and most preferably about 3 to 7, with the proviso that the sum of t and t' is not greater than 15. To assure a facile reaction, it is preferred that R, R', R", R''', s, s', t and t' be selected in a manner sufficient to provide the compounds of Formulas II and III with typically at least one primary or secondary amine group, preferably at least two primary or secondary amine groups. This can be achieved by selecting at least one of said R, R', R" or R''' groups to be hydrogen or by letting t in Formula III be at least one when R''' is H or when the IV moiety possesses a secondary amino group. The most preferred amine of the above formulas are represented by Formula III and contain at least two primary amine groups and at least one, and preferably at least three, secondary amine groups.

Non-limiting examples of suitable amine compounds include: 1,2-diaminoethane; 1,3-diaminopropane; 1,4-diaminobutane; 1,6-diaminohexane; polyethylene amines such as diethylene triamine; triethylene tetramine; tetraethylene pentamine; polypropylene amines such as 1,2-propylene diamine; di-(1,2-propylene)triamine; di-(1,3-propylene) triamine; N,N-dimethyl-1,3-di aminopropane; N,N-di-(2-aminoethyl) ethylene diamine; N,N-di(2-hydroxyethyl)-1,3-propylene diamine; 3-dodecyloxypropylamine; N-dodecyl-1,3-propane diamine; tris hydroxymethylaminomethane (THAM); diisopropanol amine; diethanol amine; triethanol amine; mono-, di-, and tri-tallow amines; amino morpholines such as N-(3-aminopropyl)morpholine; and mixtures thereof.

Other useful amine compounds include: alicyclic diamines such as 1,4-di(aminomethyl) cyclohexane, and heterocyclic nitrogen compounds such as imidazolines, and N-aminoalkyl piperazines of the general formula (V):

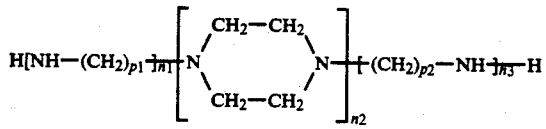

wherein $p_1$ and $p_2$ are the same or different and are each integers of from 1 to 4, and $n_1$, $n_2$ and $n_3$ are the same or different and are each integers of from 1 to 3. Non-limiting examples of such amines include 2-pentadecyl imidazoline: N-(2-aminoethyl) piperazine; etc.

Commercial mixtures of amine compounds may advantageously be used. For example, one process for preparing alkylene amines involves the reaction of an involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylenetetramine, tetraethylene pentamine and isomeric piperazines. Low cost poly(ethyleneamines) compounds averaging about 5 to 7 nitrogen atoms per molecule are available commercially under trade names such as "Polyamine H", "Polyamine 400", "Dow Polyamine E-100", etc.

Useful amines also include polyoxyalkylene polyamines such as those of the formulae:

where m has a value of about 3 to 70 and preferably 10 to 35; and

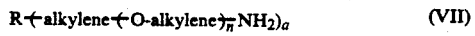

where "n" has a value of about 1 to 40 with the provision that the sum of all the n's is from about 3 to about 70 and preferably from about 6 to about 35, and R is a polyvalent saturated hydrocarbon radical of up to ten carbon atoms wherein the number of substituents on the R group is represented by the value of "a", which is a number of from 3 to 6. The alkylene groups in either formula (VI) or (VII) may be straight or branched chains containing about 2 to 7, and preferably about 2 to 4 carbon atoms.

The polyoxyalkylene polyamines of formulas (VI) or (VII) above, preferably polyoxyalkylene diamines and polyoxyalkylene triamines, may have average molecular weights ranging from about 200 to about 4000 and preferably from about 400 to about 2000. The preferred polyoxyalkylene polyoxyalkylene polyamines include the polyoxyethylene and polyoxypropylene diamines and the polyoxypropylene triamines having average molecular weights ranging from about 200 to 2000. The polyoxyalkylene polyamines are commercially available and may be obtained, for example, from the Jefferson Chemical Company, Inc. under the trade name "Jeffamines D-230, D-400, D-1000, D-2000, T-403", etc.

Additional amines useful in the present invention are described in U.S. Pat. No. 3,445,441, the disclosure of which is hereby incorporated by reference in its entirety.

Thus, any polyamine, whether aliphatic, cycloaliphatic, aromatic, heterocyclic, etc., can be employed provided it is capable of adding across the acrylic double bond and amidifying with for example the carbonyl group (—C(O)—) of the acrylate-type compound of formula I, or with the thiocarbonyl group (—C(S)—) of the thioacrylate-type compound of formula I.

The alpha, beta ethylenically unsaturated compounds employed in this invention comprise at least one member selected from the group consisting of alpha, beta ethylenically unsaturated compounds of the formula:

wherein X is sulfur or oxygen, Y is —OR$^4$, —SR$^4$, or —NR$^4$(R$^5$), and R$^1$, R$^2$, R$^3$, R$^4$ and R$^5$ are the same or different and are hydrogen or substituted or unsubstituted hydrocarbyl.

When R$^1$, R$^2$, R$^3$, R$^4$ or R$^5$ are hydrocarbyl, these groups can comprise alkyl, cycloalkyl, aryl, alkaryl, aralkyl or heterocyclic, which can be substituted with groups which are substantially inert to any component of the reaction mixture under conditions selected for preparation of the amido-amine. Such substituent groups include hydroxy, halide (e.g., Cl, Fl, I, Br), —SH and alkylthio. When one or more of R$^1$ through R$^5$ are alkyl, such alkyl groups can be straight or branched chain, and will generally contain from 1 to 20, more usually from 1 to 10, and preferably from 1 to 4, carbon atoms. Illustrative of such alkyl groups are methyl, ethyl, propyl, butyl, pentyl, hexyl, heptyl, octyl, nonyl, decyl, dodecyl, tridecyl, hexadecyl, octadecyl and the like. When one or more of R$^1$ through R$^5$ are aryl, the aryl group will generally contain from 6 to 10 carbon atoms (e.g., phenyl, naphthyl).

When one or more of R$^1$ through R$^5$ are alkaryl, the alkaryl group will generally contain from about 7 to 20 carbon atoms, and preferably from 7 to 12 carbon atoms. Illustrative of such alkaryl groups are tolyl, m-ethylphenyl, o-ethyltolyl, and m-hexyltolyl. When one or more of R$^1$ through R$^5$ are aralkyl, the aryl component generally consists of phenyl or (C$_1$ to C$_6$) alkyl-substituted phenol and the alkyl component generally contains from 1 to 12 carbon atoms, and preferably from 1 to 6 carbon atoms. Examples of such aralkyl groups are benzyl, o-ethylbenzyl, and 4-isobutylbenzyl. When one or more of R$^1$ and R$^5$ are cycloalkyl, the cycloalkyl group will generally contain from 3 to 12 carbon atoms, and preferably from 3 to 6 carbon atoms. Illustrative of such cycloalkyl groups are cyclopropyl, cyclobutyl, cyclohexyl, cyclooctyl, L and cyclododecyl. When one or more of R$^1$ through R$^5$ are heterocyclic, the heterocyclic group generally consists of a compound having at least one ring of 6 to 12 members in which on or more ring carbon atoms is replaced by oxygen or nitrogen.

Examples of such heterocyclic groups are furyl, pyranyl, pyridyl, piperidyl, dioxanyl, tetrahydrofuryl, pyrazinyl and 1,4-oxazinyl.

The alpha, beta ethylenically unsaturated carboxylate compounds employed herein have the following formula:

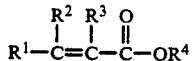
(VIII)

wherein $R^1$, $R^2$, $R^3$, and $R^4$ are the same or different and are hydrogen or substituted or unsubstituted hydrocarbyl as defined above. Examples of such alpha, beta-ethylenically unsaturated carboxylate compounds of formula VIII are acrylic acid, methacrylic acid, the methyl, ethyl, isopropyl, n-butyl, and isobutyl esters of acrylic and methacrylic acids, 2-butenoic acid, 2-hexenoic acid, 2-decenoic acid, 3-methyl-2-heptenoic acid, 3-methyl-2-butenoic acid, 3-phenyl-2-propenoic acid, 3-cyclohexyl-2-butenoic acid, 2-methyl-2-butenoic acid, 2-propyl-2-propenoic acid, 2-isopropyl-2-hexenoic acid, 2,3-dimethyl-2-butenoic acid, 3-cyclohexyl-2-methyl-2-pentenoic acid, 2-propenoic acid, methyl 2-propenoate, methyl 2-methyl 2-propenoate, methyl 2-butenoate, ethyl 2-hexenoate, isopropyl 2-decenoate, phenyl 2-pentenoate, tertiary butyl 2-propenoate, octadecyl 2-propenoate, dodecyl 2-decenoate, cyclopropyl 2,3-dimethyl-2-butenoate, methyl 3-phenyl-2-propenoate, and the like.

The alpha, beta ethylenically unsaturated carboxylate thioester compounds employed herein have the following formula:

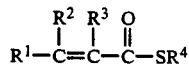
(IX)

wherein $R^1$, $R^2$, $R^3$, and $R^4$ are the same or different and are hydrogen or substituted or unsubstituted hydrocarbyl as defined above. Examples of such alpha, beta-ethylenically unsaturated carboxylate thioesters of formula IX are methylmercapto 2-butenoate, ethylmercapto 2-hexenoate, isopropylmercapto 2-decenoate, phenylmercapto 2-pentenoate, tertiary butylmercapto 2-propenoate, octadecylmercapto 2-propenoate, dodecylmercapto 2-decenoate, cyclopropylmercapto 2,3-dimethyl-2-butenoate, methylmercapto 3-phenyl-2-propenoate, methylmercapto 2-propenoate, methylmercapto 2-methyl-2-propenoate, and the like.

The alpha, beta ethylenically unsaturated carboxyamide compounds employed herein have the following formula:

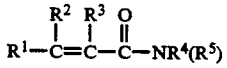
(X)

wherein $R^1$, $R^2$, $R^3$, $R^4$ and $R^5$ are the same or different and are hydrogen or substituted or unsubstituted hydrocarbyl as defined above. Examples of alpha, beta-ethylenically unsaturated carboxyamides of formula X are 2-butenamide, 2-hexenamide, 2-decenamide, 3-methyl-2-heptenamide, 3-methyl-2-butenamide, 3-phenyl-2-propenamide, 3-cyclohexyl-2-butenamide, 2-methyl-2-butenamide, 2-propyl-2-propenamide, 2-isopropyl-2-hexenamide, 2,3-dimethyl-2-butenamide, 3-cyclohexyl-2-methyl-2-pentenamide, N-methyl 2-butenamide, N,N-diethyl 2-hexenamide, N-isopropyl 2-decenamide, N-phenyl 2-pentenamide, N-tertiary butyl 2-propenamide, N-octadecyl 2-propenamide, N-N-didodecyl 2-decenamide, N-cyclopropyl 2,3-dimethyl-2-butenamide, N-methyl 3-phenyl-2-propenamide, 2-propenamide, 2-methyl-2-propenamide, 2-ethyl-2-propenamide and the like.

The alpha, beta ethylenically unsaturated thiocarboxylate compounds employed herein have the following formula:

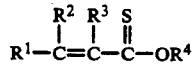
(XI)

wherein $R^1$, $R^2$, $R^3$, and $R^4$ are the same or different and are hydrogen or substituted or unsubstituted hydrocarbyl as defined above. Examples of alpha, beta-ethylenically unsaturated thiocarboxylate compounds of formula XI are 2-butenthioic acid, 2-hexenthioic acid, 2-decenthioic acid, 3-methyl-2-heptenthioic acid, 3-methyl-2-butenthioic acid, 3-phenyl-2-propenthioic acid, 3-cyclohexyl-2-butenthioic acid, 2-methyl-2-butenthioic acid, 2-propyl-2-propenthioic acid, 2-isopropyl-2-hex enthioic acid, 2,3-dimethyl-2-butenthioic acid, 3-cyclohexyl-2-methyl-2-pententhioic acid, 2-propenthioic acid, methyl 2-propenthioate, methyl 2-methyl 2-propenthioate, methyl 2-butenthioate, ethyl 2-hexenthioate, isopropyl 2-decenthioate, phenyl 2-pententhioate, tertiary butyl 2-propenthioate, octadecyl 2-propenthioate, dodecyl 2-decenthioate, cyclopropyl 2,3-dimethyl-2-butenthioate, methyl 3-phenyl-2-propenthioate, and the like.

The alpha, beta ethylenically unsaturated dithioic acid and acid ester compounds employed herein have the following formula:

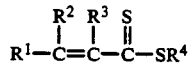
(XII)

wherein $R^1$, $R^2$, $R^3$, and $R^4$ are the same or different and are hydrogen or substituted or unsubstituted hydrocarbyl as defined above. Examples of alpha, beta-ethylenically unsaturated dithioic acids and acid esters of formula XII are 2-butendithioic acid, 2-hexendithioic acid, 2-decendithioic acid, 3-methyl-2-heptendithioic acid, 3-methyl-2-butendithioic acid, 3-phenyl-2-propendithioic acid, 3-cyclohexyl-2-butendithioic acid, 2-methyl-2-butendithioic acid, 2-propyl-2-propendithioic acid, 2-isopropyl-2-hexendithioic acid, 2,3-dimethyl-2-butendithioic acid, 3-cyclohexyl-2-methyl-2-pentendithioic acid, 2-propendithioic acid, methyl 2-propendithioate, methyl 2-methyl 2-proendithioate, methyl 2-butendithioate, ethyl 2-hexendithioate, isopropyl 2-decendithioate, phenyl 2-pentendithioate, tertiary butyl 2-propendithioate, octadecyl 2-propendithioate, dodecyl 2-decendithioate, cyclopropyl 2,3-dimethyl-2-butendithioate, methyl 3-phenyl-2-propendithioate, and the like.

The alpha, beta ethylenically unsaturated thiocarboxyamide compounds employed herein have the following formula:

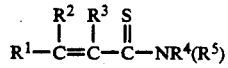
(XIII)

wherein $R^1, R^2, R^3, R^4$ and $R^5$ are the same or different and are hydrogen or substituted or unsubstituted hydrocarbyl as defined above. Examples of alpha, beta-ethylenically unsaturated thiocarboxyamides of formula XIII are 2-butenthioamide, 2-hexenthioamide, 2-decenthioamide, 3-methyl-2-heptenthioamide, 3-methyl-2-butenthioamide, 3-phenyl-2-propenthioamide, 3-cyclohexyl-2-butenthioamide, 2-methyl-2-butenthioamide, 2-propyl-2-propenthioamide, 2-isopropyl-2-hexenthioamide, 2,3-dimethyl-2-butenthioamide, 3-cyclohexyl-2-methyl-2-pententhioamide, N-methyl 2-butenthioamide, N,N-diethyl 2-hexenthioamide, N-isopropyl 2-decenthioamide, N-phenyl 2-pententhioamide, N-tertiary butyl 2-propenthioamide, N-octadecyl 2-propenthioamide, N-N-didodecyl 2-decenthioamide, N-cyclopropyl 2,3-dimethyl-2-butenthioamide, N-methyl 3-phenyl-2-propenthioamide, 2-propenthioamide, 2-methyl-2-propenthioamide, 2-ethyl-2-propenthioamide and the like.

Preferred compounds for reaction with the polyamines in accordance with this invention are lower alkyl esters of acrylic and (lower alkyl) substituted acrylic acid. Illustrative of such preferred compounds are compounds of the formula:

(XIV)

where $R^3$ is hydrogen or a $C_1$ to $C_4$ alkyl group, such as methyl, and $R^4$ is hydrogen or a $C_1$ to $C_4$ alkyl group, capable of being removed so as to form an amido group, for example, methyl, ethyl, propyl, isopropyl, butyl, sec-butyl, tert-butyl, aryl, hexyl, etc. In the preferred embodiments these compounds are acrylic and methacrylic esters such as methyl, ethyl or propyl acrylate, methyl, ethyl or propyl methacrylate. When the selected alpha, beta-unsaturated compound comprises a compound of formula I wherein X is oxygen, the resulting reaction product with the polyamine contains at least one amido linkage ($-C(O)N<$) and such materials are herein termed "amido-amines." Similarly, when the selected alpha, beta unsaturated compound of formula I comprises a compound wherein X is sulfur, the resulting reaction product with the polyamine contains thioamide linkage ($-C(S)N<$) and these materials are herein termed "thioamido-amines." For convenience, the following discussion is directed to the preparation and use of amido-amines, although it will be understood that such discussion is also applicable to the thioamido-amines.

The type of amido-amine formed varies with reaction conditions. For example, a more linear amido-amine is formed where substantially equimolar amounts of the unsaturated carboxylate and polyamine are reacted. The presence of excesses of the ethylenically unsaturated reactant of formula I tends to yield an amido-amine which is more cross-linked than that obtained where substantially equimolar amounts of reactants are employed. Where for economic or other reasons a cross-linked amido-amine using excess amine is desired, generally a molar excess of the ethylenically unsaturated reactant of about at least 10%, such as 10-300%, or greater, for example, 25-200%, is employed. For more efficient cross-linking an excess of carboxylated material should preferably be used since a cleaner reaction ensues. For example, a molar excess of about 10-100% or greater such as 10-50%, but preferably an excess of 30-50%, of the carboxylated material. Larger excess can be employed if desired.

In summary, without considering other factors, equimolar amounts of reactants tend to produce a more linear amido-amine whereas excess of the formula I reactant tends to yield a more cross-linked amido-amine. It should be noted that the higher the polyamine (i.e., in greater the number of amino groups on the molecule) the greater the statistical probability of cross-linking since, for example, a tetraalkylenepentamine, such as tetraethylene pentamine

has more labile hydrogens than ethylene diamine.

These amido-amine adducts so formed are characterized by both amido and amino groups. In their simplest embodiments they may be represented by units of the following idealized formula:

wherein the R's, which may be the same or different, are hydrogen or a substituted group, such as a hydrocarbon group, for example, alkyl, alkenyl, alkynyl, aryl, etc., and A is a moiety of the polyamine which, for example, may be aryl, cycloalkyl, alkyl, etc., and n is an integer such as 1-10 or greater. The amido-amine adducts preferably contain an average of form 1 to 3 amido groups per molecule of the amido-amine adduct.

The above simplified formula represents a linear amido-amine polymer. However, cross-linked polymers may also be formed by employing certain conditions since the polymer has labile hydrogens which can further react with either the unsaturated moiety by adding across the double bond or by amidifying with a carboxylate group.

Preferably, however, the amido-amines of this invention are not cross-linked to any substantial degree, and more preferably are substantially linear.

Preferably, the polyamine reactant contains at least one primary amine (and more preferably from 2 to 4 primary amines) group per molecule, and the polyamine and the unsaturated reactant of formula I are contacted in an amount of from about 1 to 10, more preferably from about 2 to 6, and most preferably from about 3 to 5, equivalents of primary amine in the polyamine reactant per mole of the unsaturated reactant of formula I.

The reaction between the selected polyamine and acrylate-type compound is carried out at any suitable temperature. Temperatures up to the decomposition points of reactants and products can be employed. In practice, one generally carries out the reaction by heating the reactants below 100° C., such as 80°-90° C., for a suitable period of time, such as a few hours. Where an acrylic-type ester is employed, the progress of the reaction can be judged by the removal of the alcohol in forming the amide. During the early part of the reaction alcohol is removed quite readily below 100° C. in the case of low boiling alcohols such as methanol or ethanol. As the reaction slows, the temperature is raised to push the polymerization to completion and the temperature may be raised to 150° C. toward the end of the reaction. Removal of alcohol is a convenient method of judging the progress and completion of the reaction which is generally continued until no more alcohol is evolved. Based on removal of alcohol, the yields are generally stoichiometric. In more difficult reactions, yield of at least 95% are generally obtained.

Similarly, it will be understood that the reaction of an ethylenically unsaturated carboxylate thioester of formula IX liberates the corresponding $HSR^4$ compound (e.g., $H_2S$ when $R^4$ is hydrogen) as a by-product, and the reaction of an ethylenically unsaturated carboxyamide of formula X liberates the corresponding $HNR^4(R^5)$ compound (e.g., ammonia when $R^4$ and $R^5$ are each hydrogen) as by-product.

The reaction time involved can vary widely depending on a wide variety of factors. For example, there is a relationship between time and temperature. In general, lower temperature demands longer times. Usually, reaction times of from about 2 to 30 hours, such as 5 to 25 hours, and preferably 3 to 10 hours will be employed.

Although one can employ a solvent, the reaction can be run without the use of any solvent. In fact, where a high degree of cross-linking is desired, it is preferably to avoid the use of a solvent and most particularly to avoid a polar solvent such as water. However, taking into consideration the effect of solvent on the reaction, where desired, any suitable solvent can be employed, whether organic or inorganic, polar or non-polar.

copolymer, is readily reacted with the amido-amine by introducing the amido amine into said grafted ethylene copolymer containing solution and heating at a temperature of from about 100° C. to 250° C., preferably from 125° to 175° C., for from about 1 to 10 hours, usually about 2 to about 6 hours. The heating is preferably carried out, in the case of ethylene copolymer substituted dicarboxylic acid material, to favor formation of imides or mixtures of imides and amides rather than amides and salts. In the case of ethylene copolymer substituted monocarboxylic acid material heating is preferably carried out to favor formation of amides rather than salts. Removal of water assures completion of the imidation/amidation reaction. Reaction ratios can vary considerably, depending upon the reactants, amounts of excess, type of bonds formed, etc. Generally, from about 1 to 5, preferably from about 1.5 to 3 moles of ethylene copolymer substituted monocarboxylic or dicarboxylic acid moiety content, e.g., grafted succinic anhydride content, is used per equivalent of amido amine reactant, e.g., amine.

An example of the reaction of an amido amine reactant with ethylene copolymer substituted dicarboxylic acid material is the reaction of ethylene-propylene copolymer substituted succinic anhydride (EPSA) with a poly amido-amine having two terminal $-NH_2$ groups, which can be illustrated as follows:

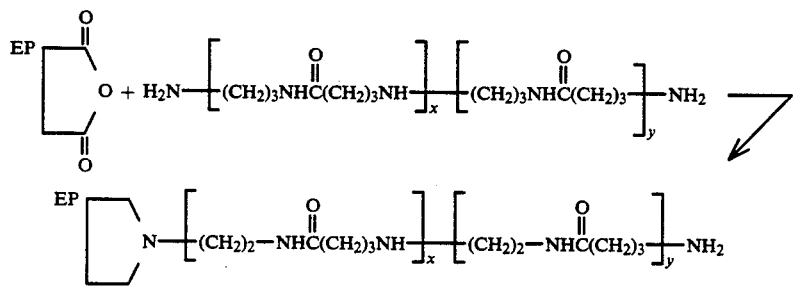

As an example of the amido-amine adducts, the reaction of tetraethylene pentaamine (TEPA) with methyl acrylate can be illustrated as follows:

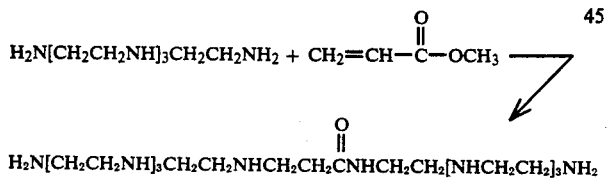

wherein x and y are each integers of from 0 to 10, with the proviso that the sum of x+y is at least 1, e.g., 1 to 20.

An example of the reaction of an amido-amine reactant with an ethylene copolymer substituted monocarboxylic acid material is the reaction of ethylene-propylene copolymer substituted propionic acid (EPA) with a poly amido-amine having two terminal $-NH_2$ groups, which can be illustrated as follows:

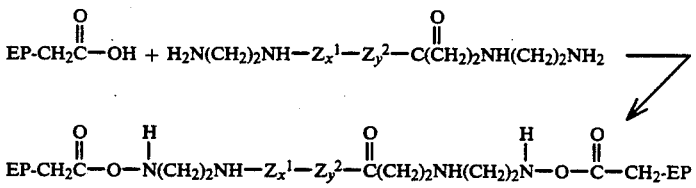

REACTION OF GRAFTED ETHYLENE COPOLYMER WITH AMIDO AMINE

The grafted high molecular weight ethylene copolymer, preferably in solution, such as an oil solution, containing 5 to 95 wt. %, preferably 5 to 30 wt. %, and more preferably 10 to 20 wt. % of said grafted ethylene wherein x and y are each integers of from 0 to 10, with the proviso that the sum of x+y is at least 1, e.g., 1 to 20 and wherein $Z^1$ and $Z^2$ are the same or different and are each moieties of the formula:

It will be understood that the amido-amine reactant can be employed alone or in admixture with any of the above described amines, such as the polyalkylene polyamines, useful in preparing the amido-amine reactant.

Preferably, the ethylene copolymer substituted mono- or dicarboxylic acid material and amido-amine will be contacted for a time and under conditions sufficient to react substantially all of the primary nitrogens in the amido-amine reactant. The progress of this reaction can be followed by infra-red analysis.

This reaction can be conducted in a polar or nonpolar solvent, e.g., xylene, toluene, benzene, and the like, and is preferably conducted in the presence of a mineral or synthetic lubricating oil.

$C_{12}$ to $C_{18}$ HYDROCARBYL SUBSTITUTED DICARBOXYLIC ANHYDRIDE

In accordance with the instant invention the adduct or reaction product of the acid material grafted high molecular weight ethylene copolymer and amido amine described hereinafore is reacted or post-treated with a $C_{12}$ to about $C_{18}$, preferably $C_{12}$ to $C_{16}$, hydrocarbyl substituted dicarboxylic anhydride. The particular type of dicarboxylic anhydride used is critical to the present invention, and must be a $C_{12}$ to about $C_{18}$ hydrocarbyl substituted dicarboxylic anhydride. The anhydride used in the present invention may be represented by the general formula RX wherein R is a hydrocarbyl group containing a total of from 12 to about 18, preferably 12 to 16, more preferably 12 to 14, and most preferably 12, carbons, which are essentially aliphatic, saturated or unsaturated, and include alkenyl and alkyl groups, preferably alkenyl groups, and can be straight chain or branched. When R is an alkenyl group it is preferred that the olefinic unsaturation site be located near the anhydride, e.g., allylic to X, moiety. The radical X will usually contain 4 to 10, preferably 4 to 8, more preferably 4 to 6, and most preferably 4, carbon atoms and will define a dicarboxylic anhydride. The X radical may be represented by the formula

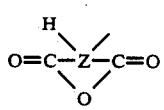

wherein Z is selected from alkylene and alkenylene radicals containing from 2 to 8, preferably 2 to 6, more preferably 2 to 4, and most preferably 2 carbon atoms. Prefeably Z is an alkylene radical. The most preferred X radical is the succinic anhydride radical, i.e.,

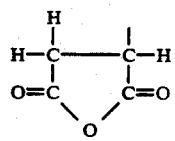

The X radical is linked to the R group by a carbon linkage.

Dicarboxylic acid anhydride materials of the above types and methods for their production are well known. Alkenyl substituted dicarboxylic acid anhydrides can be made by the reaction of the $C_{12}$ to about $C_{18}$ alpha mono-olefin, or chlorinated mono-olefin, with maleic anhydride, e.g., European application 82-302326.2, incorporated herein by reference. Hydrogenation can give the corresponding alkyl derivative.

It is important to the present invention that this anhydride component be a $C_{12}$ to about $C_{18}$ hydrocarbyl substituted dicarboxylic anhydride. If an acid instead of an anhydride is used there will generally be no significant improvement in viscosity stability. Thus patents or literature disclosing the use of acids themselves with amines are not relevant to the present invention. Furthermore, the use of an acid itself, particularly a monocarboxylic acid, or a monocarboxylic acid anhydride, results in the formation of an acid by-product which is deleterious to the end use of the oleaginous composition containing the V.I. improver - dispersant of the present invention, e.g., causes corrosion.

If the dicarboxylic anhydride contains no hydrocarbyl substituent groups, e.g., succinic anhydride, or if it contains a hydrocarbyl substituent group of less than 12 carbon atoms its effectiveness in solubilizing the insoluble grafted oil particles produced during the free radical grafting in an oil medium of the ethylene copolymer is adversely affected. Thus, such dicarboxylic anhydrides are generally ineffective in reducing the haze of the grafted ethylene copolymer/oil solution. This, in turn, requires an additional haze-treating step described in U.S. Pat. No. 4,137,185. The use of the $C_{12}$ to about $C_{18}$ hydrocarbyl substituted dicarboxylic anhydrides, preferably $C_{12}$ to about $C_{18}$ hydrocarbyl substituted succinic anhydrides and more preferably $C_{12}$ to about $C_{18}$ alkyl substituted succinic anhydrides, of the instant invention is effective in solubilizing the grafted oil particles, thereby reducing haze and generally eliminating the need for a haze-treating step.

The amount of the hydrocarbyl substituted dicarboxylic acid anhydride component utilized is a viscosity stabilizing effective amount. By viscosity stabilizing effective amount is meant any amount which is effective to stabilize the viscosity of an oleaginous solution of the derivatized ethylene copolymers, i.e., inhibit or retard the increase in viscosity over an extended period of time of an oil solution, particularly an oil concentrate, of the nitrogen containing grafted ethylene copolymers. Generally this amount is from about 0.5–2.5, preferably 1–1.5 moles of $C_{12}$ to about $C_{18}$ hydrocarbyl substituted dicarboxylic acid anhydride per mole of unreacted primary amino group of the ethylene copolymer grafted with a carboxylic acid material and thereafter reacted with the amido amine or thioamido amine.

The chain extension termination or end-capping of the nitrogen containing grafted ethylene copolymer which was preferentially prepared in a mineral oil solution can be conducted by subsequently introducing the $C_{12}$ to about $C_{18}$ hydrocarbyl substituted dicarboxylic acid anhydride of the present invention directly into the reaction system used to prepare said nitrogen containing grafted ethylene copolymer, or it can be a separate non-integrated reaction step. In any event, the nitrogen containing carboxylic acid material grafted ethylene copolymer is first produced by preparing the graft copolymer of ethylene and ethylenically monounsaturated carboxylic acid and then reacting this graft copolymer with at least one amido amino, and this preformed nitrogen containing grafted ethylene copolymer is then subsequently reacted or treated with the $C_{12}$ to about $C_{18}$ hydrocarbyl substituted dicarboxylic anhydride in a end-capping or chain extension limiting step. A viscosity stabilizing effective amount of the $C_{12}$ to about $C_{18}$ hydrocarbyl substituted dicarboxylic acid anhydride is introduced into the heated solution containing the nitrogen containing grafted ethylene copolymer and the reaction carried on for a period of about 0.25 to 8 hours at a temperature ranging from about 50° to 250° C., a temperature of about 100° to 200° C. being preferred. In order to fully complete the reaction, it is generally useful to utilize a slight excess, i.e., about 1 to 30, more usually about 1 to 10, percent by weight of the $C_{12}$ to about $C_{18}$ hydrocarbyl substituted dicarboxylic anhydride. The entire reaction is generally carried out under an inert atmosphere, for example, a nitrogen blanket.

This reaction can be conducted in a polar or nonpolar solvent, e.g., xylene, toluene, benzene, and the like, and is preferably conducted in the presence of a mineral or synthetic lubricating oil.

In another, and generally preferred, embodiment of the instant invention the carboxylic acid material grafted high molecular weight ethylene copolymer is reacted with the amido-amine and a carboxylic acid component described infra or with the preformed reaction products, e.g., salts, amides, imides, of said amido-amine and carboxylic acid component, and the resultant reaction product is then reacted with the $C_{12}$-$C_{18}$ hydrocarbyl substituted dicarboxylic anhydride.

CARBOXYLIC ACID COMPONENT

The carboxylic acid component includes: hydrocarbyl substituted dicarboxylic acid or anhydride, preferably succinic anhydride or acid, having 12 to 49 carbons, preferably 16 to 49 carbons in said hydrocarbyl group; long chain monocarboxylic acid of the formula RCOOH where R is a hydrocarbyl group of 50 to 400 carbons; and long chain hydrocarbyl substituted dicarboxylic acid or anhydride, preferably succinic anhydride or acid, having about 50 to about 400 carbons in said hydrocarbyl group. Said hydrocarbyl groups are essentially aliphatic and include alkenyl and alkyl groups. The longer chain acids and anhydrides are preferred, particularly when the grafting reaction is carried out in lubricating oil. More preferred are the about $C_{50}$ to about $C_{400}$ hydrocarbyl substituted dicarboxylic acids or anhydrides.

The about $C_{50}$-$C_{400}$ hydrocarbyl subtituted dicarboxylic acid or anhydride includes the reaction product of the $C_{50}$-$C_{400}$ hydrocarbon polymer, generally a polyolefin, with (i) monounsaturated $C_4$ to $C_{10}$ dicarboxylic acid wherein (a) the carboxyl groups are vicinyl, i.e., located on adjacent carbon atoms, and (b) at least one, preferably both, of said adjacent carbon atoms are part of said monounsaturation; or with (ii) derivatives of (i) such as anhydrides of (i). Upon reaction with the hydrocarbon polymer, the monounsaturation of the dicarboxylic acid, anhydride, etc. becomes saturated. Thus for example, maleic anhydride becomes a hydrocarbyl substituted succinic anhydride.

Typically, from about 0.7 to about 4.0 (e.g., 0.8 to 2.6), preferably from about 1.0 to about 2.0, and most preferably from about 1.1 to about 1.7 moles of said unsaturated $C_4$ to $C_{10}$ dicarboxylic acid, anhydride or ester are charged to the reactor per mole of polyolefin charged.

Normally, not all of the polyolefin reacts with the unsaturated acid or derivative and the hydrocarbyl substituted dicarboxylic acid material will contain unreacted polyolefin. The unreacted polyolefin is typically not removed from the reaction mixture (because such removal is difficult and would be commercially infeasible) and the product mixture, stripped of any unreacted monounsaturated $C_4$ to $C_{10}$ dicarboxylic acid or anhydride, is employed as the carboxylic acid component.

Characterization of the average number of moles of dicarboxylic acid or anhydride, which have reacted per mole of polyolefin charged to the reaction (whether it has undergone reaction or not) is defined herein as functionality. Said functionality is based upon (i) determination of the saponification number of the resulting product mixture using potassium hydroxide; and (ii) the number average molecular weight of the polymer charged, using techniques well known in the art. Functionality is defined solely with reference to the resulting product mixture. Although the amount of said reacted polyolefin contained in the resulting product mixture can be subsequently modified, i.e., increased or decreased by techniques known in the art, such modifications do not alter functionality as defined above. The term $C_{50}$-$C_{400}$ hydrocarbyl substituted dicarboxylic acid material is intended to refer to the product mixture whether it has undergone such modification or not.

Accordingly, the functionality of the $C_{50}$-$C_{400}$ hydrocarbyl substituted dicarboxylic acid material will be typically at least about 0.5, preferably at least about 0.8, and most preferably at least about 0.9 and will vary typically from about 0.5 to about 2.8 (e.g., 0.6 to 2), preferably from about 0.8 to about 1.4, and most preferably from about 0.9 to about 1.3.

Exemplary of such unsaturated dicarboxylic acids or anhydrides thereof are fumaric acid, itaconic acid, maleic acid, maleic anhydride, chloromaleic acid, chloromaleic anhydride, etc.

Preferred about $C_{50}$ to about $C_{400}$ olefin polymers for reaction with the unsaturated dicarboxylic acids or derivatives thereof are polymers comprising a major molar amount of $C_2$ to $C_{10}$, e.g., $C_2$ to $C_5$ monoolefin. Such olefins include ethylene, propylene, butylene, isobutylene, pentene, octene-1, styrene, etc. The polymers can be homopolymers such as polyisobutylene, as well as copolymers of two or more of such olefins such as copolymers of: ethylene and propylene; butylene and isobutylene; propylene and isobutylene; etc. Other copolymers include those in which a minor molar amount of the copolymer monomers, e.g., 1 to 10 mole %, is a $C_4$ to $C_{18}$ non-conjugated diolefin, e.g., a copolymer of isobutylene and butadiene; or a copolymer of ethylene, propylene and 1,4-hexadiene; etc.

In some cases, the olefin polymer may be completely saturated, for example an ethylene-propylene copolymer made by a Ziegler-Natta synthesis usig hydrogen as a moderator to control molecular weight.

The olefin polymers used will usually have number average molecular weights within the range of about 700 and about 5,600, more usually between about 800 and about 3000. Particularly useful olefin polymers have number average molecular weights within the range of about 900 and about 2500 with approximately one terminal double bond per polymer chain. An especially useful starting material is polyisobutylene. The number average molecular weight for such polymers can be determined by several known techniques. A convenient method for such determination is by gel permeation chromatography (GPC) which additionally provides molecular weight distribution information, see W. W. Yau, J. J. Kirkland and D. D. Bly, "Modern Size Exclusion Liquid Chromatography", John Wley and Sons, New York, 1979.

Processes for reacting the about $C_{50}$ to about $C_{400}$ olefin polymer with the $C_{4-10}$ unsaturated dicarboxylic acid or anhydride are known in the art. For example, the olefin polymer and the dicarboxylic acid or derivative may be simply heated together as disclosed in U.S. Pat. Nos. 3,361,673 and 3,401,118 to cause a thermal "ene" reaction to take place. Or, the olefin polymer can be first halogenated, for example, chlorinated or brominated to about 1 to 8 wt. %, preferably 3 to 7 wt. % chlorine, or bromine, based on the weight of polymer, by passing the chlorine or bromine through the polyolefin at a temperature of 60° to 250° C., e.g. 120° to 160° C., for about 0.5 to 10, preferably 1 to 7 hours. The halogenated polymer may then be reacted with sufficient unsaturated acid or derivative at 100° to 250° C., usually about 180° to 235° C., for about 0.5 to 10, e.g. 3 to 8 hours, so the product obtained will contain the desired number of moles of the unsaturated acid or derivative per mole of the halogenated polymer. Processes of this general type are taught in U.S. Pat. Nos. 3,087,936; 3,172,892; 3,272,746 and others.

Alternatively, the olefin polymer, and the unsaturated acid or derivative are mixed and heated while adding chlorine to the hot material. Processes of this type are disclosed in U.S. Pat. Nos. 3,215,707; 3,231,587; 3,912,764; 4,110,349; and in U.K. 1,550,219.

By the use of halogen, about 65 to 95 wt. % of the polyolefin, e.g. polyisobutylene will normally reacted with the dicarboxylic acid or derivative. Upon carrying out a thermal reaction without the use of halogen or a catalyst, then usually only about 50 to 75 wt. % of the polyisobutylene will react. Chlorination helps increased the reactivity.

Particularly preferred as the acid component is polyisobutenyl succinic anhydride.

PRE-REACTED AMIDO AMINE-CARBOXYLIC ACID COMPONENT

The aforesaid amido-amine and carboxylic acid component may be pre-reacted, with the acid being generally attached to the amido-amine through salt, imide, amide, or other linkages so that a primary or secondary amine group of the amido-amine is still available for reaction with the acid moieties of the grafted high molecular weight ethylene copolymer. A convenient source of these pre-reacted materials are the lubricating oil dispersant, provided they retain primary amine groups capable of further reaction with the grafted ethylene copolymer, described in U.S. application Ser. No. 126,405, filed Nov. 30, 1987 and U.S. application Ser. No. 269,461, filed Nov. 10, 1988, both of which are incorporated herein by reference.

The grafted high molecular weight ethylene copolymer is reacted with the amido-amine and carboxylic acid component or pre-reacted amido-amine-carboxylic acid component substantially as described hereinafore for the reaction of the grafted high molecular weight ethylene copolymer with the amido-amine. Thus, for example a reaction mixture containing the grafted high molecular weight ethylene copolymer, e.g., ethylene-propylene substituted succinic anhydride, and carboxylic acid component, e.g., polyisobutylene substituted succinic anhydride, is prepared by admixing these two reactants, and the amido-amine is then introduced into this reaction mixture and the reaction is carried out as described hereinafore. Alternatively, the carboxylic acid component and amido-amine may be added substantially simultaneously to a reaction mixture containing the grafted high molecular weight ethylene copolymer.

Generally, the amount of the carboxylic acid component utilized is an amount sufficient to provide about 0.5 to about 4, preferably from about 1 to about 2 moles of said carboxylic acid component per molar amount of the carboxylic acid moieties present in the grafted ethylene copolymer. For example, with a grafted ethylene-propylene copolymer of about 40,000 $\overline{M}_n$, i.e., a thickening efficiency of about 2.1 g and averaging 4 succinic anhydride groups per molecule, about 4 moles of polyisobutenyl succinic anhydride would preferably be used per mole of grafted copolymer. Generally, from about 1 to 5, preferably from about 1.5 to 3 moles of the combined carboxylic acid moiety content of the grafted ethylene copolymer and the carboxylic acid content are used per equivalent of amido-amine reactant, e.g., amine.

The multifunctional viscosity index improvers of this invention can be used alone or in admixture with other viscosity index improvers or dispersants. The other viscosity index improvers or viscosity modifiers are generally high molecular weight hydrocarbon polymers including polyesters. These other viscosity modifiers may also be derivatized, as by grafting with a carboxylic acid material of the type described hereinafore and thereafter reacting with a polyamine of the type described hereinafore as a polyol, to include other properties or functions, such as the addition of dispersancy properties. These oil soluble viscosity modifying polymers will generally have number average molecular weights of from $10^3$ to $10^6$, preferably $10^4$ to $10^6$, e.g., 20,000 to 250,000, as determined by gel permeation chromatography or osmometry.

Examples of suitable hydrocarbon polymers include homopolymers and copolymers of two or more monomers of $C_2$ to $C_{30}$, e.g. $C_2$ to $C_8$ olefins, including both alpha olefins and internal olefins, which may be straight or branched, aliphatic, aromatic, alkyl-aromatic, cyclo-aliphatic, etc. Frequently they will be of ethylene with $C_3$ to $C_{30}$ olefins, particularly preferred being the copolymers of ethylene and propylene. Other polymers can be used such as polyisobutylenes, homopolymers and copolymers of $C_6$ and higher alpha olefins, atactic polypropylene, hydrogenated polymers and copolymers and terpolymers of styrene, e.g. with isoprene and/or butadiene and hydrogenated derivatives thereof. The polymer may be degraded in molecular weight, for example by mastication, extrusion, oxidation or thermal degradation, and it may be oxidized and contain oxygen. Also included are derivatized polymers such as post-grafted interpolymers of ethylene-propylene with an active monomer such as maleic anhydride which may be further reacted with an alcohol, or amine, e.g. an alkylene polyamine or hydroxy amine, e.g. see U.S. Pat. Nos. 4,089,794; 4,160,739; 4,137,185; or copolymers of ethylene and propylene reacted or grafted with nitrogen compounds such as shown in U.S. Pat. Nos. 4,068,056; 4,068,058; 4,146,489 and 4,149,984.

The preferred hydrocarbon polymers are ethylene copolymers containing from 15 to 90 wt. % ethylene, preferably 30 to 80 wt. % of ethylene and 10 to 85 wt. %, preferably 20 to 70 wt. % of one or more $C_3$ to $C_{28}$, preferably $C_3$ to $C_{18}$, more preferably $C_3$ to $C_8$, alpha-olefins. While not essential, such copolymers preferably have a degree of crystallinity of less than 25 wt. %, as determined by X-ray and differential scanning calorimetry. Copolymers of ethylene and propylene are most preferred. Other alpha-olefins suitable in place of propylene to form the copolymer, or to be used in combination with ethylene and propylene, to form a terpolymer, tetrapolymer, etc., include 1-butene, 1-pentene, 1-hexene, 1-heptene, 1-octene, 1-nonene, 1-decene, etc.; also branched chain alpha-olefins, such as 4-methyl-1-pentene, 4-methyl-1-hexene, 5-methylpentene-1, 4,4-dimethyl-1-pentene, and 6-methylheptene-1, etc., and mixtures thereof.

Terpolymers, tetrapolymers, etc., of ethylene, said $C_{3-28}$ alpha-olefin, and a non-conjugated diolefin or mixtures of such diolefins may also be used. The amount of the non-conjugated diolefin generally ranges from about 0.5 to 20 mole percent, preferably from about 1 to about 7 mole percent, based on the total amount of ethylene and alpha-olefin present.

The polyester V.I. improvers are generally polymers of esters of ethylenically unsaturated $C_3$ to $C_8$ mono- and dicarboxylic acids such as methacrylic and acrylic acids, maleic acid, maleic anhydride, fumaric acid, etc.

Examples of unsaturated esters that may be used include those of aliphatic saturated mono alcohols of at least 1 carbon atom and preferably of from 12 to 20 carbon atoms, such as decyl acrylate, lauryl acrylate, stearyl acrylate, eicosanyl acrylate, docosanyl acrylate, decyl methacrylate, diamyl fumarate, lauryl methacrylate, cetyl methacrylate, stearyl methacrylate, and the like and mixtures thereof.

Other esters include the vinyl alcohol esters of $C_2$ to $C_{22}$ fatty or mono carboxylic acids, preferably saturated such as vinyl acetate, vinyl laurate, vinyl palmitate, vinyl stearate, vinyl oleate, and the like and mixtures thereof. Copolymers of vinyl alcohol esters with unsaturated acid esters such as the copolymer of vinyl acetate with dialkyl fumarates, can also be used.

The esters may be copolymerized with still other unsaturated monomers such as olefins, e.g. 0.2 to 5 moles of $C_2-C_{20}$ aliphatic or aromatic olefin per mole of unsaturated ester, or per mole of unsaturated acid or anhydride followed by esterification. For example, copolymers of styrene with maleic anhydride esterified with alcohols and amines are known, e.g., see U.S. Pat. No. 3,702,300.

Such ester polymers may be grafted with, or the ester copolymerized with, polymerizable unsaturated nitrogen-containing monomers to impart dispersancy to the V.I. improvers. Examples of suitable unsaturated nitrogen-containing monomers include those containing 4 to 20 carbon atoms such as amino substituted olefins as p-(beta-diethylaminoethyl)styrene; basic nitrogen-containing heterocycles carrying a polymerizable ethylenically unsaturated substituent, e.g. the vinyl pyridines and the vinyl alkyl pyridines such as 2-vinyl-5-ethyl pyridine, 2-methyl-5-vinyl pyridine, 2-vinyl-pyridine, 4-vinylpyridine, 3-vinyl-pyridine, 3-methyl-5-vinyl-pyridine, 4-methyl-2-vinyl-pyridine, 4-ethyl-2-vinyl-pyridine and 2-butyl-1-5-vinyl-pyridine and the like.

N-vinyl lactams are also suitable, e.g. N-vinyl pyrrolidones or N-vinyl piperidones.

The vinyl pyrrolidones are preferred and are exemplified by N-vinyl pyrrolidone, N-(1-methylvinyl) pyrrolidone, N-vinyl-5-methyl pyrrolidone, N-vinyl-3, 3-dimethylpyrrolidone, N-vinyl-5-ethyl pyrrolidone, etc.

Dispersants maintain oil insolubles, resulting from oxidation during use, in suspension in the fluid thus preventing sludge flocculation and precipitation as deposition on metal parts. Suitable dispersants include alkyl succinimides, the reaction product of oil-soluble polyisobutylene succinic anhydride with polyamines such as tetraethylene pentamine, and borated salts thereof. Such dispersants are disclosed, inter alia, in Belgium Patent No. 658,236 and U.S. Pat. No. 3,272,746.

Other dispersants include the esters derived from long chain hydrocarbon substituted dicarboxylic acid material and hydroxy compounds such as monohydric and polyhydric alcohols or aromatic compounds such as phenols and naphthols, etc. The polyhydric alcohols are the most preferred hydroxy compound and preferably contain from 2 to about 10 hydroxy radicals, for example, ethylene glycol, diethylene glycol, triethylene glycol, tetraethylene glycol, dipropylene glycol, and other alkylene glycols in which the alkylene radical contains from 2 to about 8 carbon atoms. Other useful polyhydric alcohols include glycerol, mono-oleate of glycerol, monostearate of glycerol, monomethyl ether of glycerol, pentaerythritol, dipentaerythritol, and mixtures thereof.

The ester dispersant may also be derived from unsaturated alcohols such as allyl alcohol, cinnamyl alcohol, propargyl alcohol, 1-cyclohexane-3-ol, and oleyl alcohol. Still other classes of the alcohols capable of yielding the esters of this invention comprise the ether-alcohols and amino-alcohols including, for example, the oxy-alkylene, oxy-arylene-, amino-alkylene-, and amino-arylene-substituted alcohols having one or more oxy-alkylene, amino-alkylene or amino-arylene oxyarylene radicals. They are exemplified by Cellosolve, Carbitol, N,N,N',N'-tetrahydroxy-trimethylene diamine, and ether-alcohols having up to about 150 oxyalkylene radicals in which the alkylene radical contains from 1 to about 8 carbon atoms.

The ester dispersant may be di-esters of dicarboxylic acids (e.g., succinic acid or anhydride) or acidic esters, i.e., partially esterified succinic acids; as well as partially esterified polyhydric alcohols or phenols, i.e., esters having free alcohols or phenolic hydroxyl radicals. Mixtures of the above illustrated esters likewise are contemplated within the scope of this invention.

The ester dispersant may be prepared by one of several known methods as illustrated for example in U.S. Pat. No. 3,381,022. The ester dispersants may also be borated, similar to the nitrogen containing dispersants.

Hydroxyamines which can be reacted with the polymer-substituted monocarboxylic acid materials to form dispersants include 2-amino-1-butanol, 2-amino-2-methyl-1-propanol, p-(beta-hydroxyethyl)-aniline, 2-amino-1-propanol, 3-amino-1-propanol, 2-amino-2-methyl-1, 3-propane-diol, 2-amino-2-ethyl-1, 3-propanediol, N-(beta-hydroxy-propyl)-N'-(beta-aminoethyl)-piperazine, tris(hydroxymethyl) amino-methane (also known as trismethylolaminomethane), 2-amino-1-butanol, ethanolamine, beta-(beta-hydroxyethoxy)ethylamine, and the like. Mixtures of these or similar amines can also be employed. The above description of nucleophilic reactants suitable for reaction with the polymer-substituted monocarboxylic acid materials includes amines, alcohols, and compounds of mixed amine and hydroxy containing reactive functional groups, i.e., amino-alcohols.

The tris(hydroxymethyl) amino methane (THAM) can be reacted with the aforesaid acid materials to form amides, imides or ester type additives as taught by U.K. 984,409, or to form oxazoline compounds and borated oxazoline compounds as described, for example, in U.S. Pat. Nos. 4,102,798; 4,116,876 and 4,113,639.

The multifunctional viscosity index improvers of the present invention can be incorporated into a lubricating oil in any convenient way. Thus, they can be added directly to the oil by dispersing or dissolving the same in the oil at the desired level of concentration of the multifunctional viscosity index improvers. Such blending into the additional lube oil can occur at room temperature or elevated temperatures. Alternatively, the multifunctional viscosity index improvers can be blended with a suitable oil-soluble solvent and base oil to form a concentrate, and then blending the concentrate with a lubricating oil basestock to obtain the final formulation. Such multifunctional viscosity index improver concentrates will typically contain (on an active ingredient (A.I.) basis) from about 3 to about 45 wt. %, and preferably from about 10 to about 35 wt. %, multifunctional viscosity index improver additive, and typically from about 30 to 90 wt. %, preferably from about 40 to 60 wt. %, base oil, based on the concentrate weight.

The lubricating oil basestock for the multifunctional viscosity index improver typically is adapted to perform a selected function by the incorporation of additional additives therein to form lubricating oil compositions (i.e., formulations).

The amounts of the multifunctional viscosity improver additives of the instant invention which are incorporated into an oleaginous composition, e.g., lubricating oil, is an amount which is effective to improve the viscometric properties, e.g., viscosity index, of said oleaginous composition and impart dispersancy thereto, i.e., a viscosity improving and dispersant effective amount. Generally, this amount is from about 0.01 to about 20, preferably from about 0.1 to about 15, and more preferably from about 0.2 to about 5 weight percent, based on the weight of the oleaginous composition.

The oleaginous composition into which the multifunctional viscosity improvers or modifiers of the instant invention are incorporated or added include lubricating oil compositions, e.g., automatic transmission fluids, heavy duty oils suitable for gasoline and diesel engines, etc.

The multifunctional viscosity improvers of this invention may be added to the oleaginous composition in the form of an oil concentrate. Typically such oil concentrate contains from about 5 wt. % up to about 49 wt. %, preferably 7 to 25 wt. %, of the multifunctional viscosity improver in oil, e.g., mineral lubricating oil.

The fully formulated oil compositions, or the oil concentrate, may optionally contain other conventional additives such as pour point depressants, antiwear agents, antioxidants, other viscosity index improvers, dispersants, corrosion inhibitors, anti-foaming agents, detergents, rust inhibitors, friction modifiers, and the like.

Corrosion inhibitors, also known as anti-corrosive agents, reduce the degradation of the metallic parts contacted by the lubricating oil composition. Illustrative of corrosion inhibitors are phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide.

Other oxidation inhibitors or antioxidants useful in this invention comprise oil-soluble copper compounds. The copper may be blended into the oil as any suitable oil soluble copper compound. By oil soluble it is meant that the compound is oil soluble under normal blending conditions in the oil or additive package. The copper compound may be in the cuprous or cupric form. The copper may be in the form of the copper dihydrocarbyl thio- or dithio-phosphates. Alternatively, the copper may be added as the copper salt of a synthetic or natural carboxylic acid. Examples of same thus include $C_{10}$ to $C_{18}$ fatty acids, such as stearic or palmitic acid, but unsaturated acids such as oleic or branched carboxylic acids such as napthenic acids of molecular weights of from about 200 to 500, or synthetic carboxylic acids, are preferred, because of the improved handling and solubility properties of the resulting copper carboxylates. Also useful are oil-soluble copper dithiocarbamates of the general formula $(RR,NCSS)nCu$ (where n is 1 or 2 and R and R, are the same or different hydrocarbyl radicals containing from 1 to 18, and preferably 2 to 12, carbon atoms, and including radicals such as alkyl, alkenyl, aryl, aralkyl, alkaryl and cycloaliphatic radicals. Particularly preferred as R and R, groups are alkyl groups of from 2 to 8 carbon atoms. Thus, the radicals may, for example, be ethyl, n-propyl, i-propyl, n-butyl, i-butyl, sec-butyl, amyl, n-hexyl, i-hexyl, n-heptyl, n-octyl, decyl, dodecyl, octadecyl, 2-ethylhexyl, phenyl, butylphenyl, cyclohexyl, methylcyclopentyl, propenyl, butenyl, etc. In order to obtain oil solubility, the total number of carbon atoms (i.e., R and R,) will generally be about 5 or greater. Copper sulphonates, phenates, and acetylacetonates may also be used.

Exemplary of useful copper compounds are copper CuI and/or CuII salts of alkenyl succinic acids or anhydrides. The salts themselves may be basic, neutral or acidic. They may be formed by reacting (a) polyalkylene succinimides (having polymer groups of $\overline{M}_n$ of 700 to 5,000) derived from polyalkylene-polyamines, which have at least one free carboxylic acid group, with (b) a reactive metal compound. Suitable reactive metal compounds include those such as cupric or cuprous hydroxides, oxides, acetates, borates, and carbonates or basic copper carbonate.

Examples of these metal salts are Cu salts of polyisobutenyl succinic anhydride, and Cu salts of polyisobutenyl succinic acid. Preferably, the selected metal employed is its divalent form, e.g., Cu+2. The preferred substrates are polyalkenyl succinic acids in which the alkenyl group has a molecular weight greater than about 700. The alkenyl group desirably has a $M_n$ from about 900 to 1,400, and up to 2,500, with a $M_n$ of about 950 being most preferred. Especially preferred is polyisobutylene succinic anhydride or acid. These materials may desirably be dissolved in a solvent, such as a mineral oil, and heated in the presence of a water solution (or slurry) of the metal bearing material. Heating may take place between 70° and about 200° C. Temperatures of 110° C. to 140° C. are entirely adequate. It may be necessary, depending upon the salt produced, not to allow the reaction to remain at a temperature above about 140° C. for an extended period of time, e.g., longer than 5 hours, or decomposition of the salt may occur.

The copper antioxidants (e.g., Cu-polyisobutenyl succinic anhydride, Cu-oleate, or mixtures thereof) will be generally employed in an amount of from about 50 to 500 ppm by weight of the metal, in the final lubricating or fuel composition.

Friction modifiers serve to impart the proper friction characteristics to lubricating oil compositions such as automatic transmission fluids.

Representative examples of suitable friction modifiers are found in U.S. Pat. No. 3,933,659 which discloses fatty acid esters and amides; U.S. Pat. No. 4,176,074 which describes molybdenum complexes of polyisobutenyl succinic anhydride-amino alkanols; U.S. Pat. No. 4,105,571 which discloses glycerol esters of dimerized fatty acids; U.S. Pat. No. 3,779,928 which discloses alkane phosphonic acid salts; U.S. Pat. No. 3,778,375 which discloses reaction products of a phosphonate with an oleamide; U.S. Pat. No. 3,852,205 which discloses S-carboxyalkylene hydrocarbyl succinimide, S-carboxyalkylene hydrocarbyl succinamic acid and mixtures thereof; U.S. Pat. No. 3,879,306 which discloses N(hydroxyalkyl)alkenyl-succinamic acids or succinimides; U.S. Pat. No. 3,932,290 which discloses reaction products of di- (lower alkyl) phosphites and epoxides; and U.S. Pat. No. 4,028,258 which discloses the alkylene oxide adduct of phosphosulfurized N-(hydroxyalkyl) alkenyl succinimides. The disclosures of the above references are herein incorporated by reference. The most preferred friction modifiers are succinate esters, or metal salts thereof, of hydrocarbyl substituted succinic acids or anhydrides and thiobis-alkanols such as described in U.S. Pat. No. 4,344,853.

Pour point depressants, otherwise known as lube oil flow improvers, lower the temperature at which the fluid will flow or can be poured. Such additives are well known. Typically of those additives which usefully optimize the low temperature fluidity of the fluid are $C_8$–$C_{18}$ dialkylfumarate vinyl acetate copolymers, polymethacrylates, and wax naphthalene. Foam control can be provided by an antifoamant of the polysiloxane type, e.g., silicone oil and polydimethyl siloxane.

Anti-wear agents, as their name implies, reduce wear of metal parts. Representatives of conventional antiwear agents are zinc dialkyldithiophosphate and zinc diaryldithiosphate.

Detergents and metal rust inhibitors include the metal salts of sulphonic acids, alkyl phenols, sulfurized alkyl phenols, alkyl salicylates, naphthenates and other oil soluble mono- and di-carboxylic acids. Highly basic (viz, overbased) metal sales, such as highly basic alkaline earth metal sulfonates (especially Ca and Mg salts) are frequently used as detergents. Representative examples of such materials, and their methods of preparation, are found in co-pending Ser. No. 754,001, filed Jul. 11, 1985, the disclosure of which is hereby incorporated by reference.

Some of these numerous additives can provide a multiplicity of effects, e.g., a dispersant-oxidation inhibitor. This approach is well known and need not be further elaborated herein.

Compositions when containing these conventional additives are typically blended into the base oil in amounts which are effective to provide their normal attendant function. Representative effective amounts of such additives are illustrated as follows:

| Additive | Wt. % a.i. (Broad) | Wt. % a.i. (Preferred) |
|---|---|---|
| Viscosity Modifier | .01–12 | .01–4 |
| Corrosion Inhibitor | 0.01–5 | .01–1.5 |
| Oxidation Inhibitor | 0.01–5 | .01–1.5 |
| Dispersant | 0.1–20 | 0.1–8 |
| Pour Point Depressant | 0.01–5 | .01–1.5 |
| Anti-Foaming Agents | 0.001–3 | .001–0.15 |
| Anti-Wear Agents | 0.001–5 | .001–1.5 |
| Friction Modifiers | 0.01–5 | .01–1.5 |
| Detergents/Rust Inhibitors | .01–10 | .01–3 |
| Mineral Oil Base | Balance | Balance |

When other additives are employed, it may be desirable, although not necessary, to prepare additive concentrates comprising concentrated solutions or dispersions of the multifunctional viscosity improver (in concentrate amounts hereinabove described), together with one or more of said other additives (said concentrate when constituting an additive mixture being referred to here in as an additive package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the dispersant additive and optional additional additives in proper amounts to provide the desired concentration in the final formulation when the additive-package is combined with a predetermined amount of base lubricant. Thus, the products of the present invention can be added to small amounts of base oil or other compatible solvents along with other desirable additives to form additive-packages containing active ingredients in collective amounts of typically from about 2.5 to about 80%, and preferably from about 5 to about 60%, and most preferably from about 8 to about 49% by weight additives in the appropriate proportions with the remainder being base oil.

The final formulations may employ typically about 10 wt. % of the additive-package with the remainder being base oil.

All of said weight percents expressed herein are based on active ingredient (a.i.) content of the additive, and/or upon the total weight of any additive-package, or formulation which will be the sum of the a.i. weight of each additive plus the weight of total oil or diluent.

The instant compositions of matter useful as multifunctional viscosity modifiers or improvers are oil-soluble, dissolvable in oil with the aid of a suitable solvent, or are stably dispersible materials. Oil-soluble, dissolvable, or stably dispersible as that terminology is used herein does not necessarily indicate that the materials are soluble, dissolvable, miscible, or capable of being suspended in oil in all proportions. It does mean, however, that the additives, for instance, are soluble or stably dispersible in oil to an extent sufficient to exert their intended effect in the environment in which the oil is employed. Moreover, the additional incorporation of other additives may also permit incorporation of higher levels of a particular copolymer hereof, if desired.

The following Examples further illustrate the instant invention. They are presented by way of illustration and not limitation. Unless otherwise indicated, all parts and percentages are on a weight basis.

The following examples illustrate the preparation of amido-amines of the instant invention.

EXAMPLE 1

Into a reactor vessel are charged 148 grams (2 moles) of 1,3-propane diamine and stirred at room temperature under a nitrogen atmosphere. 86 grams (one mole) of methyl acrylate are slowly introduced into the reactor vessel while keeping the resulting reaction mixture below 50° C. After the methyl acrylate addition is complete the reaction mixture is heated at 80° C. until infrared analysis shows the absence of the ester bond. The reaction mixture is then stripped at 80° C. for one hour to distill off the methanol byproduct. Analysis of the resulting amido-amine product indicates 9.93 meq. of primary nitrogen per gram of sample and 27.64% nitrogen.

EXAMPLE 2

The procedure of Example 1 is repeated except that the 148 grams of 1,3-propane diamine are replaced with 203 grams (2 moles) of diethylene triamine. Analysis of the resulting amido-amine product indicates 4.48 meq. of primary nitrogen per gram of sample and 25.85% nitrogen.

EXAMPLE 3

The procedure of Example 1 is repeated except that the 148 grams of 1,3-propane diamine are replaced with 292 grams (2 moles) of triethylene triamine. Analysis of the resulting amido-amine product indicates 3.67 meq. of primary nitrogen per gram of sample and 26.76% nitrogen.

EXAMPLE 4

The procedure of Example 1 is repeated except that the 148 grams of 1,3-propane diamine are replaced with 378 grams (2 moles) of tetraethylene pentamine. Analysis of the resulting amido-amine product indicates 4.39 meq. of primary nitrogen per gram of sample and 28.3% nitrogen.

The following Examples illustrate the preparation of the nitrogen containing carboxylic acid material grafted ethylene propylene copolymers of the instant invention.

EXAMPLE 5

Into a reactor vessel are charged 200 grams of a 20 wt. % oil solution of succinic-anhydride grafted ethylene-propylene copolymer (containing about 43 wt. % ethylene and 57% wt. % propylene, the ethylene-propylene backbone having a $\overline{M}_n$ of about 80,000, and having a thickening efficiency of about 1.2), 21.3 grams of polyisobutenyl succinic anhydride (having a succinic anhydride to polyisobutenyl mole ratio of 1.04, a polyisobutylene $\overline{M}_n$ of about 960, ASTM Saponification Number of 112, and 90 wt. % active ingredient, i.e., polyisobutenyl succinic anhydride, the remainder being primarily unreacted polyisobutylene), and 130 grams of S130N mineral oil. The reactor vessel is blanketed with nitrogen and heated to 175° C. for one-half hour. To this reactor vessel are then added 4.12 grams of amido-amine prepared in accordance with the procedure of Example 1. The reaction mixture is nitrogen stripped for 3 hours at 175° C. To this heated reaction mixture are added 1.2 grams of dodecenyl succinic anhydride and the heating is continued for one-half hour while nitrogen stripping. At the end of this period the reaction mixture is cooled to 100° C. and is discharged from the reaction vessel.

EXAMPLE 6

The procedure of Example 5 is repeated except that the 4.12 grams of the amido-amine prepared in accordance with the procedure of Example 1 are replaced with 9.02 grams of amido-amine prepared in accordance with the procedure of Example 2.

EXAMPLE 7

The procedure of Example 5 is repeated except that the 4.12 grams of the amido-amine prepared in accordance with the procedure of Example 1 are replaced with 11.0 grams of amido-amine prepared in accordance with the procedure of Example 3.

EXAMPLE 8

The procedure of Example 5 is repeated except that the 4.12 grams of the amido-amine prepared in accordance with the procedure of Example 1 are replaced with 9.2 grams of amido-amine prepared in accordance with the procedure of Example 4.

Thickening efficiency (T.E.) is defined as the ratio of the weight percent of a polyisobutylene (sold as an oil solution by Exxon Chemical Company as Paratone N), having a Staudinger molecular weight of 20,000, required to thicken a solvent-extracted neutral mineral lubricating oil, having a viscosity of 150 SUS at 37.8° C., a viscosity index of 105 and an ASTM pour point of 0° F. (Solvent 150 Neutral) to a viscosity of 12.4 centistokes at 98.9° C. to the weight percent of a test copolymer required to thicken the same oil to the same viscosity at the same temperature. For linear polymers of a given ethylene content, the thickening efficiency is approximately proportional to the 0.75 power of the weight-average molecular weight.

What is claimed is:

1. An oil soluble composition of matter useful as a multifunctional viscosity improver additive for oleaginous composition comprising reaction product of:

(A) high molecular weight ethylene copolymer substituted carboxylic acid material comprising reaction product of (i) ethylene copolymer having a number average molecular weight of at least about 15,000, and (ii) monounsaturated carboxylic acid material, said ethylene copolymer substituted carboxylic acid material containing an average number of acid material moieties grafted or present on a 10,000 number average molecular weight segment of a molecule of ethylene copolymer of at least about 0.1;

(B) amido-amine or thioamido-amine comprising reaction product of (i) polyamine, and (ii) alpha, beta-unsaturated compound represented by the formula

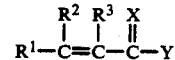

wherein X is oxygen or sulfur, Y is $-OR^4$, $-SR^4$, or

and $R^1$, $R^2$, $R^3$, $R^4$ and $R^5$ are independently selected from hydrogen, hydrocarbyl, and substituted hydrocarbyl; and (D) viscosity stabilizing effective amount of $C_{12}$ to about $C_{18}$ hydrocarbyl substituted $C_4$ to $C_{10}$ dicarboxylic anhydride.

2. The composition of matter according to claim 1 wherein said polyamine (B)(i) comprises polyamines containing from 2 to 60 carbon atoms and from 2 to 12 nitrogen atoms per molecule.

3. The composition of matter according to claim 2 wherein said polyamine comprises alkylenepolyamine or polyalkylenepolyamine wherein each alkylene group contains 2 to 6 carbons and said alkylenepolyamine or polyalkylenepolyamine contains from 2 to about 5 nitrogen atoms per molecule.

4. The composition of matter according to claim 1 wherein said monounsaturated carboxylic acid material (A)(ii) is selected from the group consisting of $C_4$ to $C_{10}$ monounsaturated dicarboxylic acid material, $C_3$ to $C_{10}$ monounsaturated monocarboxylic acid material, and mixtures thereof.

5. The composition of matter according to claim 4 wherein said adduct is comprised of (A), (B), (D) and (C) $C_{50}$–$C_{400}$ hydrocarbyl substituted dicarboxylic acid or anhydride, or $C_{50}$–$C_{400}$ hydrocarbyl substituted monocarboxylic acid.

6. The composition of matter according to claim 5 wherein said (C) is $C_{50}$–$C_{400}$ hydrocarbyl substituted dicarboxylic acid or anhydride.

7. The composition of matter according to claim 6 wherein said $C_{50}$–$C_{400}$ hydrocarbyl substituted dicarboxylic acid or anhydride is $C_{50}$–$C_{400}$ hydrocarbyl substituted succinic acid or anhydride.

8. The composition of matter according to claim 7 wherein said $C_{50}$–$C_{400}$ hydrocarbyl substituted succinic acid or anhydride is polyisobutylene substituted succinic acid or anhydride.

9. The composition of matter according to claim 4 wherein (D) comprises $C_{12}$ to about $C_{18}$ hydrocarbyl substituted succinic anhydride.

10. The composition of matter according to claim 9 wherein (D) comprises $C_{12}$ to about $C_{18}$ alkenyl substituted succinic anhydride.

11. The composition of matter according to claim 4 wherein said ethylene copolymer (A)(i) comprises copolymer of ethylene and at least one $C_3$ to $C_{28}$ alpha-olefin.

12. The composition of matter according to claim 11 wherein said $C_3$ to $C_{28}$ alpha-olefin is propylene.

13. The composition of matter according to claim 11 wherein said adduct is comprised of (A), (B), (D) and (C) $C_{50}$–$C_{400}$ hydrocarbyl substituted dicarboxylic acid or anhydride, or $C_{50}$–$C_{400}$ hydrocarbyl substituted monocarboxylic acid.

14. The composition of matter according to claim 13 wherein said (C) is $C_{50}$–$C_{400}$ hydrocarbyl substituted dicarboxylic acid or anhydride.

15. The composition of matter according to claim 14 wherein said $C_{50}$–$C_{400}$ hydrocarbyl substituted dicarboxylic acid or anhydride (C) is $C_{50}$–$C_{400}$ hydrocarbyl substituted succinic acid or anhydride.

16. The composition of matter according to claim 15 wherein said $C_{50}$–$C_{400}$ hydrocarbyl substituted succinic acid or anhydride (C) is polyisobutenyl substituted succinic acid or anhydride.

17. The composition of matter according to claim 9 wherein said ethylene copolymer (A)(i) comprises a copolymer of ethylene and at least one $C_3$ to $C_{28}$ alpha-olefin.

18. The composition of matter according to claim 17 wherein said $C_3$ to $C_{28}$ alpha-olefin is propylene.

19. The composition of matter according to claim 10 wherein said ethylene copolymer (A)(i) comprises copolymer of ethylene and at least one $C_3$ to $C_{28}$ alpha-olefin.

20. The composition of matter according to claim 19 wherein said $C_3$ to $C_2$ alpha-olefin is propylene.

21. The composition of matter according to claim 4 wherein said monounsaturated carboxylic acid material (A)(ii) comprises $C_4$ to $C_{10}$ monounsaturated dicarboxylic acid material.

22. The composition of matter according to claim 21 wherein said $C_4$ to $C_{10}$ monounsaturated dicarboxylic acid material is selected from the group consisting of maleic acid, maleic anhydride and mixtures thereof.

23. The composition of matter according to claim 21 wherein said ethylene copolymer (A)(i) comprises a copolymer of ethylene and at least one $C_3$ to $C_{28}$ alpha-olefin.

24. The composition of matter according to claim 15 wherein said $C_3$ to $C_{28}$ alpha-olefin is propylene.

25. The composition of matter according to claim 1 wherein (B)(ii) is selected from the $C_1$ to $C_4$ alkyl esters of acrylic acid or methacrylic acid.

26. The composition of matter according to claim 25 wherein (B)(ii) contains from 2 to about 60 carbon atoms and from 2 to 12 nitrogen atoms per molecule, with the proviso that at least 2 of said nitrogen atoms are primary nitrogen.

27. The composition of matter according to claim 20 wherein (B)(i) is selected from alkylenepolyamines and polyalkylenepolyamines wherein each alkylene contains from about 2 to 6 carbons and said alkylene-polyamine or polyalkylenepolyamine contains from about 2 to 9 nitrogens.

28. The composition of matter according to claim 27 wherein said alkylenepolyamine or polyalkylenepolyamine contains from 2 to about 5 nitrogens.

29. The composition of matter according to claim 22 wherein said ethylene copolymer (A)(i) comprises copolymer of ethylene and at least one $C_3$ to $C_{28}$ alpha-olefin.

30. The composition of matter according to claim 29 wherein said $C_3$ to $C_{28}$ alpha-olefin is propylene.

31. The composition of matter according to claim 1 wherein said ethylene copolymer (A)(i) comprises a copolymer of ethylene and at least one $C_3$ to $C_{28}$ alpha-olefin.

32. The composition of matter according to claim 31 wherein said $C_3$ to $C_{28}$ alpha-olefin is propylene.

33. The composition of matter according to claim 1 wherein said alpha-, beta-unsaturated compound (B)(ii) comprises at least one member selected from the group consisting of methyl acrylate, ethyl acrylate, propyl acrylate, butyl acrylate, methyl methacrylate, ethyl methacrylate, propyl methacrylate, and butyl methacrylate.

34. The composition of matter according to claim 33 wherein said polyamine (B)(i) comprises alkylenepolyamine or polyalkylene-polyamine wherein each alkylene group contains 2 to 6 carbons and said alkylenepolyamine or polyalkylenepolyamine contains from about 2 to about 5 nitrogen atoms per molecule.

35. The composition of matter according to claim 34 wherein said high molecular weight ethylene copolymer substituted carboxylic acid material (A) comprises at least one of ethylene-propylene copolymer substituted with succinic anhydride and ethylene-propylene copolymer substituted with succinic acid, wherein said ethylene-propylene copolymer has a number average molecular weight of at least about 15,000.

36. The composition of matter according to claim 35 wherein said polyamine (B)(i) comprises ethylenepolyamine, polyethylenepolyamine or polypropylenepolyamine.

37. The composition of matter according to claim 36 wherein said adduct is comprised of (A), (B), (D) and (C) $C_{50}$–$C_{400}$ hydrocarbyl substituted dicarboxylic acid or anhydride, or $C_{50}$–$C_{400}$ hydrocarbyl substituted monocarboxylic acid.

38. The composition of matter according to claim 37 wherein said (C) is $C_{50}$–$C_{400}$ hydrocarbyl substituted dicarboxylic acid or anhydride.

39. The composition of matter according to claim 38 wherein said $C_{50}$–$C_{400}$ hydrocarbyl substituted dicarboxylic acid or anhydride (C) is $C_{50}$–$C_{400}$ hydrocarbyl substituted succinic acid or anhydride.

40. The composition of matter according to claim 39 wherein said $C_{50}$–$C_{400}$ hydrocarbyl substituted succinic acid or anhydride (C) is polyisobutylene substituted succinic acid or anhydride.

41. The composition of matter according to claim 34 wherein said high molecular weight ethylene copolymer substituted carboxylic acid material (A) comprises ethylene-propylene copolymer substituted with propionic acid, wherein said ethylene-propylene copolymer has a number average molecular weight of at least about 15,000.

42. The composition of matter according to claim 41 wherein said polyamine (B)(i) comprises ethylenepolyamine, polyethylene-polyamine or polypropylenepolyamine.

43. The composition of matter according to claim 35 wherein said polyamine (B)(i) contains an average of at least 2 primary amino groups per molecule.

44. The composition of matter according to claim 43 wherein X of (B)(ii) is oxygen.

45. The composition of matter according to claim 44 wherein from about 3 to about 5 equivalents of said polyamine (B)(i) based on said primary amine content thereof, are reacted per mole of said alpha, beta-unsaturated compound (B)(ii).

46. The composition of matter according to claim 45 wherein said amido amine contains an average of from 1 to 3 amido groups per molecule.

47. The composition of matter according to claim 43 wherein X of (B)(ii) is sulfur.

48. The composition of matter according to claim 47 wherein from about 3 to about 5 equivalents of said polyamine (B)(i), based on said primary amine content thereof are reacted per mole of said alpha, beta-unsaturated compound (B)(ii).

49. The composition of matter according to claim 48 wherein said thioamido-amine contains an average of from 1 to 3 thioamido groups per molecule.

50. The composition of matter according to claim 41 wherein said polyamine (B)(i) contains at least 2 primary amine groups per molecule.

51. The composition of matter according to claim 50 wherein X of (B)(ii) is oxygen.

52. The composition of matter according to claim 51 wherein from about 3 to about 5 equivalents of said polyamine (B)(i), based on said primary amine content thereof, are reacted per mole of said alpha, beta-unsaturated compound (B)(ii).

53. The composition of matter according to claim 52 wherein said amido-amine contains an average of from 1 to 3 amido groups per molecule.

54. The composition of matter according to claim 50 wherein X of (B)(ii) is sulfur.

55. The composition of matter according to claim 54 wherein from about 3 to about 5 equivalents of said polyamine (B)(i), based on said primary amine content thereof, are reacted per mole of said alpha, beta-unsaturated compound (B)(ii).

56. The composition of matter according to claim 55 wherein said thioamido-amine contains an average of from 1 to 3 thioamido groups per molecule.

57. The composition of matter according to claim 2 wherein said polyamine (B)(i) contains at least 2 primary amine groups per molecule.

58. The composition of matter according to claim 57 wherein X of (B)(ii) is oxygen.

59. The composition of matter according to claim 58 wherein from about 3 to about 5 equivalents of said polyamine (B)(i), based on said primary amine content thereof, are reacted per mole of said alpha, beta-unsaturated compound (B)(ii).

60. The composition of matter according to claim 59 wherein said amido amine contains an average of from 1 to 3 amido groups per molecule.

61. The composition of matter according to claim 57 wherein X of (B)(ii) is sulfur.

62. The composition of matter according to claim 61 wherein from about 3 to about 5 equivalents of said polyamine (B)(i), based on said primary amine content thereof, are reacted per mole of said alpha, beta-unsaturated compound (B)(ii).

63. The composition of matter according to claim 62 wherein said thioamido-amine contains an average of from 1 to 3 thioamido groups per molecule.

64. An oleaginous composition exhibiting improved viscometric and dispersancy properties, and improved viscosity stability comprising:
(I) oleaginous material; and (II) multifunctional viscosity improver-dispersant additive comprising reaction product of
(A) high molecular weight ethylene copolymer substituted carboxylic acid material, said ethylene copolymer substituted carboxylic acid material containing an average number of acid material moieties grafted or present on a 10,000 number average molecular weight segment of a molecule of ethylene copolymer of at least about 0.1;
(B) amido-amine or thioamido-amine comprising reaction product of (i) polyamine, and (ii) alpha, beta-unsaturated compound represented by the formula

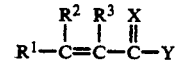

wherein X is oxygen or sulfur, Y is $-OR^4$, $-SR^4$, or

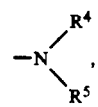

and $R^1$, $R^2$, $R^3$, $R^4$ and $R^5$ are independently selected from hydrogen, hydrocarbyl, and substituted hydrocarbyl; and (D) viscosity stabilizing effective amount of $C_{12}$ to about $C_{18}$ hydrocarbyl substituted dicarboxylic anhydride.

65. The composition according to claim 64 containing a major amount of (I) and a minor amount of (II).

66. The composition according to claim 65 wherein (I) is a lubricating oil.

67. The composition according to claim 66 which is a fully formulated lubricating oil composition.

68. The composition according to claim 66 which contains from about 5 to about 49 wt. % of (II).

69. The composition according to claim 67 containing a viscosity improving and dispersant effective amount of (II).

70. The composition according to claim 69 containing from about 0.01 to about 20 weight percent of (II).

71. The composition according to claim 70 containing from about 0.1 to about 15 weight percent of (II).

72. The composition according to claim 71 containing from about 0.2 to about 5 weight % of (II).

73. The composition according to claim 64 wherein (II)(D) comprises $C_{12}$ to about $C_{18}$ hydrocarbyl substituted succinic anhydride.

74. The composition according to claim 73 wherein said polyamine (II)(B)(i) comprises alkylenepolyamine or polyalkylenepolyamine wherein each alkylene group contains 2 to 6 carbons and said alkylenepolyamine or polyalkylene-polyamine contains from 2 to about 5 nitrogen atoms per molecule.

75. The composition according to claim 64 wherein said monounsaturated carboxylic acid material (II)(A)(ii) is selected from the group consisting of $C_4$ to $C_{10}$ monounsaturated dicarboxylic acid material, $C_3$ to $C_{10}$ monounsaturated monocarboxylic acid material, and mixtures thereof.

76. The composition according to claim 75 wherein said adduct (II) is comprised of (A), (B), (D) and (C) $C_{50}$–$C_{400}$ hydrocarbyl substituted dicarboxylic acid or anhydride, or $C_{50}$–$C_{400}$ hydrocarbyl substituted monocarboxylic acid.

77. The composition according to claim 76 wherein said (C) is $C_{50}$–$C_{400}$ hydrocarbyl substituted dicarboxylic acid or anhydride.

78. The composition according to claim 77 wherein said $C_{50}$–$C_{400}$ hydrocarbyl substituted dicarboxylic acid or anhydride (II)(C) is $C_{50}$–$C_{400}$ hydrocarbyl substituted succinic acid or anhydride.

79. The composition according to claim 78 wherein said $C_{50}$–$C_{400}$ hydrocarbyl substituted succinic acid or anhydride (C) is polyisobutenyl substituted succinic acid or anhydride.

80. The composition according to claim 75 wherein said monounsaturated carboxylic acid material (II)(A)(ii) comprises $C_4$ to $C_{10}$ monounsaturated dicarboxylic acid material.

81. The composition according to claim 80 wherein said $C_4$ to $C_{10}$ monounsaturated dicarboxylic acid material (II)(A)(ii) is selected from the group consisting of maleic anhydride, maleic acid, and mixtures thereof.

82. The composition according to claim 75 wherein said ethylene copolymer (II)(A)(i) comprises copolymer of ethylene and at least one $C_3$ to $C_{28}$ alpha-olefin.

83. The composition according to claim 82 wherein said $C_3$ to $C_{28}$ alpha-olefin is propylene.

84. The composition according to claim 80 wherein said ethylene copolymer (II)(A)(i) comprises a copolymer of ethylene and at least one $C_3$ to $C_{28}$ alpha-olefin.

85. The composition according to claim 84 wherein said $C_3$ to $C_{28}$ alpha-olefin is propylene.

86. The composition according to claim 84 wherein said adduct (II) is comprised of (A), (B), (D) and (C) $C_{50}$–$C_{400}$ hydrocarbyl substituted dicarboxylic acid or anhydride, or $C_{50}$–$C_{400}$ hydrocarbyl substituted monocarboxylic acid.

87. The composition according to claim 86 wherein said (C) is $C_{50}$–$C_{400}$ hydrocarbyl substituted dicarboxylic acid or anhydride.

88. The composition according to claim 87 wherein said $C_{50}$–$C_{400}$ hydrocarbyl substituted dicarboxylic acid or anhydride (II)(C) is $C_{50}$–$C_{400}$ hydrocarbyl substituted succinic acid or anhydride.

89. The composition according to claim 88 wherein said $C_{50}$–$C_{400}$ hydrocarbyl substituted succinic acid or anhydride (II)(C) is polyisobutylene substituted succinic acid or anhydride.

90. The composition according to claim 81 wherein said ethylene copolymer (II)(A)(i) comprises copolymer of ethylene and at least one $C_3$ to $C_{28}$ alpha-olefin.

91. The composition according to claim 90 wherein said $C_3$ to $C_{28}$ alpha-olefin is propylene.

92. The composition according to claim 75 wherein said monounsaturated dicarboxylic acid material (II)(A)(ii) comprises $C_3$ to $C_{10}$ monounsaturated mono-carboxylic acid material.

93. The composition according to claim 92 wherein said $C_3$ to $C_{10}$ monounsaturated monocarboxylic acid material (II)(A)(ii) is selected from the group consisting of acrylic acid, acrylic ester, methacrylic acid, methacrylic acid, and mixtures thereof.

94. The composition according to claim 93 wherein said ethylene copolymer (II)(A)(i) comprises a copolymer of ethylene and at least one $C_3$ to $C_{28}$ alpha-olefin.

95. The composition according to claim 94 wherein said $C_3$ to $C_{28}$ alpha-olefin is propylene.

96. The composition according to claim 94 wherein said adduct (II) is comprised of (A), (B), (D) and (C) $C_{50}$–$C_{400}$ hydrocarbyl substituted dicarboxylic acid or anhydride, or $C_{50}$–$C_{400}$ hydrocarbyl substituted monocarboxylic acid.

97. The composition according to claim 96 wherein said (C) is $C_{50}$–$C_{400}$ hydrocarbyl substituted dicarboxylic acid or anhydride.

98. The composition according to claim 97 wherein said $C_{50}$–$C_{400}$ hydrocarbyl substituted dicarboxylic acid or anhydride (II)(C) is $C_{50}$–$C_{400}$ hydrocarbyl substituted succinic acid or anhydride.

99. The composition according to claim 98 wherein said $C_{50}$–$C_{400}$ hydrocarbyl substituted succinic acid or anhydride (II)(C) is polyisobutenyl substituted succinic acid or anhydride.

100. The composition according to claim 93 wherein said ethylene copolymer (II)(A)(i) comprises copolymer of ethylene and at least one $C_3$ to $C_{28}$ alpha-olefin.

101. The composition according to claim 100 wherein said $C_3$ to $C_{28}$ alpha-olefin is propylene.

102. The composition according to claim 64 wherein said ethylene copolymer (II)(A)(i) comprises a copolymer of ethylene and at least one $C_3$ to $C_{28}$ alpha-olefin.

103. The composition according to claim 102 wherein said $C_3$ to $C_{28}$ alpha-olefin is propylene.

104. The composition according to claim 64 wherein said alpha-, beta-unsaturated compound (II)(B)(ii) comprises at least one member selected from the group consisting of methyl acrylate, ethyl acrylate, propyl acrylate, butyl acrylate, methyl methacrylate, ethyl methacrylate, propyl methacrylate, and butyl methacrylate.

105. The composition according to claim 104 wherein said polyamine (II)(B)(i) comprises alkylenepolyamine or polyalkylenepolyamine wherein each alkylene group contains 2 to 6 carbons and said alkylenepolyamine or polyalkylenepolyamine contains from about 2 to about 5 nitrogen atoms per molecule.

106. The composition according to claim 105 wherein said high molecular weight ethylene copolymer substituted carboxylic acid material comprises at least one of ethylene-propylene copolymer substituted with succinic anhydride and ethylene-propylene copolymer substituted with succinic acid, wherein said ethylene-propylene copolymer has a number average molecular weight of at least about 15,000.

107. The composition according to claim 106 wherein said polyamine (II)(B)(i) comprises ethylene-polyamine, polyethylenepolyamine, or polypropylenepolyamine.

108. The composition according to claim 105 wherein said high molecular weight ethylene copolymer substituted carboxylic acid material comprises ethylene-propylene copolymer substituted with propionic acid, wherein said ethylene-propylene copolymer has a number average molecular weight of at least about 15,000.

109. The composition according to claim 108 wherein said adduct (II) is comprised of (A), (B), (D) and (C) $C_{50}$–$C_{400}$ hydrocarbyl substituted dicarboxylic acid or anhydride, or $C_{50}$–$C_{400}$ hydrocarbyl substituted monocarboxylic acid.

110. The composition according to claim 109 wherein said (II)(C) is $C_{50}$–$C_{400}$ hydrocarbyl substituted dicarboxylic acid or anhydride.

111. The composition according to claim 110 wherein said $C_{50}$–$C_{400}$ hydrocarbyl substituted dicarboxylic acid or anhydride (II)(C) is $C_{50}$–$C_{400}$ hydrocarbyl substituted succinic acid or anhydride.

112. The composition according to claim 111 wherein said $C_{50}$–$C_{400}$ hydrocarbyl substituted succinic acid or anhydride (II)(C) is polyisobutylene substituted succinic acid or anhydride.

113. The composition according to claim 108 wherein said polyamine (II)(B)(i) comprises polyethylenepolyamine or polypropylenepolyamine.

114. The composition according to claim 106 wherein said polyamine (II)(B)(i) contains an average of at least 2 primary amine groups per molecule.

115. The composition according to claim 114 wherein X of (II)(B)(ii) is oxygen.

116. The composition according to claim 115 wherein from about 3 to about 5 equivalents of said polyamine (II)(B)(i), based on said primary amine content thereof, are reacted per mole of said alpha, beta-unsaturated compound (II)(B)(ii).

117. The composition according to claim 116 wherein said amido amine contains an average of from 1 to 3 amido groups per molecule.

118. The composition according to claim 114 wherein X of (II)(B)(ii) is sulfur.

119. The composition according to claim 118 wherein from about 3 to about 5 equivalents of said polyamine (II)(B)(i), based on said primary amine content thereof, are reacted per mole of said alpha, beta-unsaturated compound (II)(B)(ii).

120. The composition according to claim 119 wherein said thioamido-amine contains an average of from 1 to 3 thioamido groups per molecule.

121. The composition according to claim 108 wherein said polyamine (II)(B)(i) contains at least 2 primary amine groups per molecule.

122. The composition according to claim 121 wherein X of (II)(B)(ii) is oxygen.

123. The composition according to claim 122 wherein from about 3 to about 5 equivalents of said polyamine (II)(B)(i), based on said primary amine content thereof, are reacted per mole of said alpha, beta-unsaturated compound (II)(B)(ii).

124. The composition according to claim 123 wherein said amido-amine contains an average of from 1 to 3 amido groups per molecule.

125. The composition according to claim 121 wherein X of (II)(B)(ii) is sulfur.

126. The composition according to claim 64 wherein from about 3 to about 5 equivalents of said polyamine (II)(B)(i), based on said primary amine content thereof, are reacted per mole of said alpha, beta-unsaturated compound (II)(B)(ii).

127. The composition according to claim 126 wherein said thioamido-amine contains an average of from 1 to 3 thioamido groups per molecule.

128. The composition according to claim 73 wherein said polyamine (II)(B)(i) contains at least 2 primary amine groups per molecule.

129. The composition according to claim 128 wherein X of (II)(B)(ii) is oxygen.

130. The composition according to claim 129 wherein from about 3 to about 5 equivalents of said polyamine (II)(B)(i) based on said primary amine content thereof, are reacted per mole of said alpha, beta-unsaturated compound (II)(B)(ii).

131. The composition according to claim 130 wherein said amido amine contains an average of from 1 to 3 amido groups per molecule.

132. The composition according to claim 64 wherein X of (II)(B)(ii) is sulfur.

133. The composition according to claim 132 wherein from about 3 to about 5 equivalents of said polyamine (II)(B)(i), based on said primary amine content thereof are reacted per mole of said alpha, beta-unsaturated compound (II)(B)(ii).

134. The composition according to claim 133 wherein said thioamido-amine contains an average of from 1 to 3 thioamido groups per molecule.

135. A process for producing composition of matter useful as multifunctional viscosity improver oil additive comprising:

(A) providing carboxylic acid material grafted high molecular weight ethylene copolymer comprising reaction product of (i) ethylene copolymer having a number average molecular weight of at least 15,000, and (ii) monounsaturated carboxylic acid material, said ethylene copolymer substituted carboxylic acid material containing an average number of acid material moieties grafted or present on a 10,000 number average molecular weight segment of a molecule of ethylene copolymer of at least about 0.1;

(B) providing amido amine or thioamido amine compound containing at least one primary amino group comprising reaction product of (i) at least one polyamine, and (ii) at least one alpha, beta-unsaturated compound represented by the formula

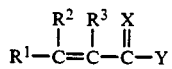

wherein X is oxygen or sulfur, Y is $-OR^4$, $-SR^4$, or

and $R^1$, $R^2$, $R^3$, $R^4$ and $R^5$ are independently selected from hydrogen, hydrocarbyl, and substituted hydrocarbyl radicals;

(C) contacting said carboxylic acid material grafted high molecular weight ethylene copolymer with said amido amine or thioamide amine in amounts and under conditions sufficient to effect reaction of at least a portion of the primary amino groups of said amido amine with at least a portion of said carboxylic acid material groups in said carboxylic acid material grafted high molecular weight ethylene copolymer to form nitrogen containing acid material grafted high molecular weight ethylene copolymer;

(D) providing a viscosity stabilizing effective amount of $C_{12}$ to about $C_{18}$ hydrocarbyl substituted dicarboxylic anhydride; and (E) contacting said viscosity stabilizing effective amount of $C_{12}$ to about $C_{18}$ hydrocarbyl substituted dicarboxylic anhydride with said nitrogen containing acid material grafted high molecular weight ethylene copolymer under conditions sufficient to effect reaction of a substantial portion of any remaining unreacted primary amino groups of said nitrogen containing acid material grafted high molecular weight ethylene copolymer with said $C_{12}$ to about $C_{18}$ hydrocarbyl substituted dicarboxylic anhydride to form said composition of matter.

136. The process according to claim 135 wherein said $C_{12}$ to about $C_{18}$ hydrocarbyl substituted dicarboxylic anhydride is $C_{12}$ to about $C_{18}$ hydrocarbyl substituted succinic anhydride.

137. The process according to claim 135 wherein in (A) a mixture of (a) carboxylic acid material grafted high molecular weight ethylene copolymer and (b) $C_{50}$-$C_{400}$ hydrocarbyl substituted dicarboxylic acid or anhydride or $C_{50}$-$C_{400}$ hydrocarbyl substituted monocarboxylic acid is provided, and wherein in (C) said mixture of (a) and (b) is contacted with said amido amine or thioamido amine to effect said reaction and to form said nitrogen containing acid material grafted high molecular weight ethylene copolymer.

138. The process according to claim 137 wherein (b) is $C_{50}$-$C_{400}$ hydrocarbyl substituted dicarboxylic acid or anhydride, and wherein said $C_{50}$-$C_{400}$ hydrocarbyl substituted dicarboxylic acid or anhydride is $C_{50}$-$C_{400}$ hydrocarbyl substituted succinic acid or anhydride.

139. The process according to claim 138 wherein said $C_{50}$-$C_{400}$ hydrocarbyl substituted succinic acid or anhydride is polyisobutylene succinic acid or anhydride.

140. The process according to claim 135 wherein said carboxylic acid material grafted high molecular weight ethylene copolymer is $C_4$-$C_{10}$ dicarboxylic acid material grafted high molecular weight ethylene copolymer.

141. The process according to claim 140 wherein said $C_4$-$C_{10}$ dicarboxylic acid material grafted high molecular weight ethylene copolymer is succinic anhydride grafted high molecular weight ethylene copolymer.

142. The process according to claim 141 wherein said succinic anhydride grafted high molecular weight ethylene copolymer is succinic anhydride grafted high molecular weight ethylene-propylene copolymer.

143. The process according to claim 137 wherein said carboxylic acid material grafted high molecular weight ethylene copolymer is $C_4$-$C_{10}$ dicarboxylic acid material grafted high molecular weight ethylene copolymer.

144. The process according to claim 143 wherein said $C_4$-$C_{10}$ dicarboxylic acid material grafted high molecular weight ethylene copolymer is succinic anhydride grafted high molecular weight ethylene copolymer.

145. THe process according to claim 144 wherein said succinic anhydride grafted high molecular weight ethylene copolymer is succinic anhydride grafted high molecular weight ethylene-propylene copolymer.

146. The process according to claim 136 wherein said carboxylic acid material grafted high molecular weight ethylene copolymer is $C_3$-$C_{10}$ monocarboxylic acid material grafted high molecular weight ethylene copolymer.

147. The process according to claim 146 wherein said $C_3$-$C_{10}$ monocarboxylic acid material grafted high molecular weight ethylene copolymer is $C_3$-$C_{10}$ monocarboxylic acid material grafted high molecular weight ethylene-propylene copolymer.

148. The process according to claim 137 wherein said carboxylic acid material grafted high molecular weight ethylene copolymer is $C_3$-$C_{10}$ monocarboxylic acid material grafted high molecular weight ethylene copolymer.

149. The process according to claim 148 wherein said $C_3$-$C_{10}$ monocarboxylic acid material grafted high molecular weight ethylene copolymer is $C_3$-$C_{10}$ monocarboxylic acid material grafted ethylene-propylene copolymer.

150. The process according to claim 135 wherein said polyamine comprises polyamines containing from 2 to 60 carbon atoms and from 2 to 12 nitrogen atoms per molecule.

151. The process according to claim 150 wherein said polyamine comprises alkylenepolyamine or polyalkylenepolyamine wherein each alkylene group contains 2 to 6 carbons and said alkylenepolyamine or polyalkylenepolyamine contains from 2 to about 5 nitrogen atoms per molecule.

152. The process according to claim 135 wherein said carboxylic acid material grafted high molecular weight ethylene copolymer comprises succinic anhydride grafted ethylene-propylene copolymer of a number average molecular weight of at least about 15,000, said polyamine comprises alkylenepolyamine or polyalkylenepolyamine wherein each alkylene group contains 2 to 6 carbons and said alkylenepolyamine or polyalkylenepolyamine contains 2 to 5 nitrogen atoms per molecule, and X is oxygen.

153. The process according to claim 137 wherein said polyamine comprises amines containing from 2 to 60 carbon atoms and from 1 to 12 nitrogen atoms per molecule.

154. The process according to claim 153 wherein said polyamine comprises alkylenepolyamine or polyalkylenepolyamine wherein each alkylene group contains 2 to 6 carbons and said alkylenepolyamine or polyalkylenepolyamine contains from 2 to about 5 nitrogen atoms per molecule.

155. The process according to claim 137 wherein said carboxylic acid material grafted high molecular weight ethylene copolymer (a) comprises succinic anhydride grafted ethylene-propylene copolymer of a number average molecular weight of at least about 15,000, (b) is polyisobutylene substituted succinic anhydride, said polyamine comprises alkylenepolyamine or polyalkylenepolyamine wherein each alkylene group contains 2 to 6 carbons and said alkylenepolyamine or polyalkylenepolyamine contains 2 to about 5 nitrogen atoms per molecule, and X is oxygen.

* * * * *